United States Patent [19]

Flexman, Jr.

[11] Patent Number: 5,318,813
[45] Date of Patent: Jun. 7, 1994

[54] POLYOXYMETHYLENE/THERMOPLASTIC POLYURETHANE/AMORPHOUS THERMOPLASTIC POLYMER BLENDS

[75] Inventor: Edmund A. Flexman, Jr., Wilmington, Del.

[73] Assignee: E. I. du Pont de Nemours and Company, Wilmington, Del.

[21] Appl. No.: 797,323

[22] Filed: Nov. 25, 1991

Related U.S. Application Data

[63] Continuation-in-part of Ser. No. 420,494, Oct. 12, 1989, abandoned.

[51] Int. Cl.$^5$ ............................................. B29D 23/22
[52] U.S. Cl. ................................. 428/36.9; 525/131; 525/154; 525/395; 525/399
[58] Field of Search ............... 525/154, 131, 399, 395; 428/36.9

[56] References Cited

U.S. PATENT DOCUMENTS

| | | | |
|---|---|---|---|
| 3,476,832 | 11/1969 | Pritchard | 525/154 |
| 3,595,937 | 7/1971 | Weissermel | 525/400 |
| 3,642,940 | 2/1972 | Hoescht | 525/155 |
| 3,646,159 | 2/1972 | Miller | 525/398 |
| 3,654,219 | 4/1972 | Bayer | 524/508 |
| 4,052,348 | 10/1977 | Harris et al. | 260/5 |
| 4,130,604 | 12/1978 | Edelman | 260/860 |
| 4,179,479 | 12/1979 | Carter, Jr. | 525/66 |
| 4,277,577 | 7/1981 | Burg et al. | 525/400 |
| 4,296,216 | 10/1981 | Sakano | 525/66 |
| 4,526,921 | 7/1985 | Sakurai et al. | 524/405 |
| 4,535,127 | 8/1985 | Matsuzaki et al. | 525/154 |
| 4,640,949 | 2/1987 | Wagman | 524/227 |
| 4,683,267 | 6/1987 | Lindner et al. | 525/133 |
| 4,713,414 | 12/1987 | Kusumgar | 525/64 |
| 4,804,716 | 2/1989 | Flexman, Jr. | 525/399 |

FOREIGN PATENT DOCUMENTS

| | | |
|---|---|---|
| 741163 | 5/1970 | Belgium . |
| 0117664 | 2/1983 | European Pat. Off. . |
| 156285A | 10/1985 | European Pat. Off. . |
| 0247870 | 12/1987 | European Pat. Off. . |
| 253649 | 1/1988 | European Pat. Off. . |
| 0253649 | 1/1988 | European Pat. Off. . |
| 38-20724 | 10/1963 | Japan . |
| 68023329 | 10/1963 | Japan . |
| 4319031 | 8/1968 | Japan . |
| 51-039746 | 4/1976 | Japan . |
| 58-045252 | 3/1983 | Japan . |
| 59-176342 | 10/1984 | Japan . |
| 60-210666 | 10/1985 | Japan . |
| 61-171756 | 8/1986 | Japan . |

OTHER PUBLICATIONS

Melt–Blending Composition of Polyacetal/Polycarbonate/Polyaminomethanol, Mi Yun et al. (Research Institute for Applied Chemistry, Communication University).

*Primary Examiner*—Melvyn I. Marquis
*Assistant Examiner*—D. Aylward

[57] ABSTRACT

This invention relates to blends containing (a) 40–98 weight percent polyoxymethylene, (b) 1–40 weight percent thermoplastic polyurethane, and (c) 1–59 weight percent of at least one amorphous thermoplastic polymer, said blends being characterized as having better mold shrinkage than polyoxymethylene/thermoplastic polyurethane compositions and also having a useful balance of physical properties, such as stiffness, elongation, and toughness.

18 Claims, No Drawings

POLYOXYMETHYLENE/THERMOPLASTIC POLYURETHANE/AMORPHOUS THERMOPLASTIC POLYMER BLENDS

CROSS REFERENCE TO RELATED APPLICATION

This application is a continuation-in-part of U.S. patent application Ser. No. 07/420,494, filed Oct. 12, 1989, abandoned.

BACKGROUND

1. Technical Field

This invention relates to certain polyoxymethylene blends which are characterized as having improved mold shrinkage and also having a useful overall balance of physical properties.

Polyoxymethylene compositions are generally understood to include compositions based on homopolymers of formaldehyde or of cyclic oligomers of formaldehyde, for example trioxane, the terminal groups of which are end-capped by esterification or etherification, as well as copolymers of formaldehyde or of cyclic oligomers of formaldehyde, with oxyalkylene groups with at least two adjacent carbon atoms in the main chain, the terminal groups of which copolymers can be hydroxyl terminated or can be end-capped by esterification or etherification. The proportion of the comonomers can be up to 20 weight percent. Compositions based on polyoxymethylene of relatively high molecular weight, i.e., 20,000 to 100,000 are useful in preparing semi-finished and finished articles by any of the techniques commonly used with thermoplastic materials, e.g., compression molding, injection molding, extrusion, blow molding, melt spinning, stamping and thermoforming. Finished products made from such polyoxymethylene compositions possess extremely desirable physical properties, including high stiffness, strength, and solvent resistance.

Polyoxymethylene compositions containing thermoplastic polyurethanes have been recently developed and said compositions possess extraordinary toughness and/or impact resistance, along with also possessing a good overall balance of physical properties, such as stiffness and elongation. However, these polyoxymethylene/thermoplastic polyurethane compositions, as well as polyoxymethylene alone, which possess excellent properties overall, undergo a relatively high shrinkage in the mold during mold processing. It is desirous to decrease the degree of mold shrinkage experienced by the polyoxymethylene/thermoplastic polyurethane composition (and also the polyoxymethylene itself) during mold processing so that a mold can be designed accurately and so that the mold shrinkage of the polyoxymethylene/thermoplastic polyurethane compositions can be matched with that of other polymeric compositions.

A goal of the present invention is to improve and thereby reduce the mold shrinkage that a polyoxymethylene/thermoplastic polyurethane composition undergoes during mold processing. It is further a goal of the present invention to make such an improvement in mold shrinkage while still maintaining a useful balance of the properties, such as stiffness, elongation, and toughness, that are inherent in the polyoxymethylene/thermoplastic polyurethane composition itself. It has been surprisingly found that the mold shrinkage property of a polyoxymethylene/thermoplastic polyurethane composition is significantly improved and thereby reduced when there is blended into the polyoxymethylene/thermoplastic polyurethane composition at least one amorphous thermoplastic polymer. It has further been surprisingly found that the blending of the at least one amorphous thermoplastic into the polyoxymethylene/thermoplastic polyurethane composition results in a ternary polymer blend having a useful balance of the physical properties, as measured by flexural modulus, elongation, and toughness, that are inherent in the polyoxymethylene/thermoplastic polyurethane blend itself. It has also been surprisingly found that the incorporation of certain amorphous thermoplastic polymers into polyoxymethylene itself results in an improvement in the mold shrinkage of said polyoxymethylene.

The ternary blends of the present invention are especially useful as injection molding resins and are particularly useful where it is undesirable for the polymer resin to undergo a relatively high level of shrinkage during mold processing.

2. Background Art

European Patent No. 0117664 discloses polyoxymethylene compositions having extraordinary impact resistance, which compositions consist essentially of (a) 5-15 weight percent of a least one thermoplastic polyurethane, which polyurethane has a glass transition temperature of lower than 0° C., and (b) 85-95 weight percent of at least one polyoxymethylene polymer, which polyoxymethylene polymer has a molecular weight of from 20,000 to 100,000, the above-stated percentages being based on the total amount of components (a) and (b) only, the thermoplastic polyurethane being dispersed throughout the polyoxymethylene polymer as discrete particles, and the composition having a Gardner impact value of greater than 9 J.

U.S. Pat. No. 4,804,716 discloses polyoxymethylene compositions having extraordinary toughness, which compositions consist essentially of (a) greater than 15 weight percent and not more than 40 weight percent of at least one thermoplastic polyurethane, which polyurethane has a glass transition temperature of lower than $-15°$ C., and (b) at least 60 weight percent and less than 85 weight percent of at least one polyoxymethylene polymer, which polyoxymethylene polymer has a molecular weight of from 20,000 to 100,000, the above-stated percentages being based on the total amount of components (a) and (b) only, the thermoplastic polyurethane being dispersed throughout the polyoxymethylene polymer as a separate phase having an average cross-sectional size of not greater than 0.9 microns, and the composition having a notched Izod value of greater than 375 J/m.

The polyoxymethylene compositions disclosed in these two references are the type of compositions that can be improved by the present invention to yield polyoxymethylene blends characterized as having improved and reduced mold shrinkage and a useful balance of physical properties.

U.S. Pat. No. 4,640,949 discloses compositions consisting essentially of polyoxymethylene and a stabilizer blend, said blend being comprised of a thermoplastic polyurethane with a polyamide dispersed therein as a separate phase. The polyamide is a crystalline resin (nylon 6, nylon 6/6) having a melting point greater than the melting point of the polyoxymethylene itself.

U.S. Pat. No. 4,713,414 discloses compositions having improved toughness comprising polyoxymethylene, a reactive titanate, a multiphase composite interpolymer, and optionally, a thermoplastic polyurethane.

EP 156-285-A discloses mixtures having improved cold tenacity consisting of polyoxymethylene, a rubber-elastic graft copolymer, and a polymeric third component, which can be a polyurethane. The rubber-elastic graft copolymer has a Tg of less than $-60°$ C., which is much less than would be the Tg of the matrix phase of any of the amorphous thermoplastic polymers of the present invention.

Japanese Patent Publication 61-171756 discloses compositions for electrical and electronic parts comprised of 5-30% polyoxymethylene, 5-40% thermoplastic polyurethane, and 55-90% ethylenic unsaturated nitrile-diene rubber-aromatic vinyl copolymer. This reference is directed toward modifying the vinyl copolymer compound, as evidenced by the high percentage of the vinyl copolymer required and the low percentage of polyoxymethylene required. Further, the examples teach away from using greater than ten weight percent polyoxymethylene in the composition.

U.S. Pat. No. 4,179,479 discloses compositions comprising a thermoplastic polyurethane, a polyoxymethylene, and 0.5-10% by weight of a processing aid which is an acrylic polymer having a number average molecular weight of at least 500,000. Such an acrylic polymer would not be injection moldable by standard present techniques.

U.S. Pat. No. 4,683,267 discloses compositions comprising polyoxymethylene, an elastomer, and an adipate-carbonate mixed ester.

The above references provide background information on polyoxymethylene/thermoplastic polyurethane binary blends or polyoxymethylene/thermoplastic polyurethane blends containing another component. None of these references disclose the entire and exact particulars of the presently claimed invention.

Provided below, as background information, are references related to blends/compositions of polyoxymethylene and another component. None of these references teach that the mold shrinkage of a polyoxymethylene blend/composition can be improved by the addition thereto of at least one amorphous thermoplastic polymer.

U.S. Pat. No. 4,535,127 discloses a copolymer consisting of an acetal polymer portion and a thermoplastic elastomer polymer portion. EP 253649 discloses a blend consisting of an amorphous or crystalline polymer and an oxymethylene polymer.

The following references all relate specifically to binary blends of polyoxymethylene with styrene-acrylonitrile copolymer: U.S. Pat. No. 3,642,940; U.S. Pat. No. 3,654,219; BE 741,163; J51-039,746; J68-023,329; and U.S. Pat. No. 3,476,832.

The following references all relate specifically to binary blends of polyoxymethylene with polycarbonate: U.S. Pat. No. 4,526,921; U.S. Pat. No. 4,130,604; and U.S. Pat. No. 3,646,159.

U.S. Pat. No. 3,595,937 relates to a binary composition comprised of polyoxymethylene and polyarylate.

The following references all relate specifically to binary blends of polyoxymethylene with acrylonitrile-butadiene-styrene resins or acrylonitrile-ethylene-propylene-styrene resins: U.S. Pat. No. 3,642,940; U.S. Pat. No. 4,296,216; U.S. Pat. No. 4,052,348; J6-0210,666; J5-9176,342; and J5-8045,252.

None of the above references teach the particulars of the present invention, nor do any teach that the mold shrinkage of polyoxymethylene/thermoplastic polyurethane compositions, and polyoxymethylene itself, can be improved by incorporating into said compositions at least one amorphous thermoplastic polymer.

SUMMARY OF THE INVENTION

The mold shrinkage of a polyoxymethylene/thermoplastic polyurethane composition is found to be improved when there is incorporated into said composition at least one amorphous thermoplastic polymer. It is also found that the resulting polyoxymethylene/thermoplastic polyurethane/amorphous thermoplastic polymer ternary blend possesses a useful balance of the properties, such as stiffness, elongation, and toughness, that are inherent in the polyoxymethylene/thermoplastic polyurethane composition itself. Specifically, the blends of the present invention consist essentially of (a) 40-98% of a polyoxymethylene, (b) 1-40% of a thermoplastic polyurethane, and (c) 1-59% of at least one amorphous thermoplastic polymer, with said weight percent being based upon the total of (a), (b), and (c). The ternary blends are useful as resins in injection molding processes, as well as other processes, and are particularly useful where it is undesirable for the injected resin to experience significant mold shrinkage during mold processing. It is also found that the mold shrinkage of polyoxymethylene itself is improved with the addition thereto of 5-50 weight percent of certain amorphous thermoplastic polymers.

DETAILED DESCRIPTION OF THE INVENTION

The invention relates to certain polyoxymethylene blends containing thermoplastic polyurethane which have low and improved mold shrinkage and which are characterized as having a useful balance of physical properties, as measured by stiffness, elongation, and toughness.

Polyoxymethylene/thermoplastic polyurethane compositions are useful as engineering resins due to the excellent physical properties they possess. In some applications, it is desired to reduce the degree of mold shrinkage that occurs with polyoxymethylene/thermoplastic polyurethane compositions. Low mold shrinkage is a desirable feature for an injection molding resin, such as the polyoxymethylene/thermoplastic polyurethane compositions, because it allows molds in which the resin is to be used to be cut more accurately. Generally, the less mold shrinkage a polymer resin undergoes during mold processing, the less likely one would expect that the final molded part will exhibit warpage in the mold.

It has been found that the mold shrinkage that occurs during the mold processing of a polyoxymethylene/thermoplastic polyurethane composition can be significantly reduced without unduly sacrificing the good balance of physical properties, such as stiffness, elongation, and toughness, possessed by the polyoxymethylene/thermoplastic polyurethane composition. Such an improvement in mold shrinkage is attained by blending the polyoxymethylene/thermoplastic polyurethane composition with at least one amorphous thermoplastic polymer to create a ternary blend. It is noted that it has also been found that the mold shrinkage of polyoxymethylene itself can be reduced by the addition thereto of certain amorphous thermoplastic polymers.

The ternary blends of the present invention exhibit a mold shrinkage that is surprisingly improved over that of the polyoxymethylene/thermoplastic polyurethane composition itself. Mold shrinkage, measured by the test described herein, is generally considered "best" if it is 1.0 or lower. The blends of the present invention exhibit, on average, such a mold shrinkage. Moreover, while the mold shrinkage of the polyoxymethylene/thermoplastic polyurethane composition is improved by blending the composition with at least one amorphous thermoplastic polymer, the resultant blend also retains a useful balance of the physical properties, such as stiffness, elongation, and toughness, that are possessed by the polyoxymethylene/thermoplastic polyurethane composition itself. By the term "useful" balance of properties, it is meant that on average, the physical properties of the ternary blend, as measured by flexural modulus, elongation, and toughness, are not significantly diminished from those of the same polyoxymethylene/thermoplastic polyurethane composition in the absence of the amorphous thermoplastic polymer and it further means that the overall balance of said properties is generally considered to be at least "acceptable" to those skilled in the pertinent art.

An example of a ternary blend having an "acceptable" balance of properties would be one having a mold shrinkage of about 1.5–2.5%, a flexural modulus of about 100–200 kpsi, an elongation at 2"/min of about 5–15%, and a toughness, as measured by Izod, of about 0.6–1.2 ft-lb/in, with the above properties all being measured by the particular methods described herein below. An example of a blend having a "good" balance of properties would be one having a mold shrinkage of about 1.0–1.5%, a flexural modulus of about 200–300 kpsi, an elongation at 2"/min of about 15–20%, and a toughness, as measured by Izod, of about 1.2–2.0 ft-lb/in. Finally, an example of a blend having a "best" balance of properties would be one having a mold shrinkage of about 1.0% or lower, a flexural modulus of about 300 kpsi or higher, an elongation at 2"/min of about 20 or higher, and a toughness, as measured by Izod, of about 2.0 ft-lb/in or higher. The blends claimed herein exhibit near or under the "best" mold shrinkage level and, at the very least, the blends possess the "acceptable" level for the remaining properties. It is noted that the above properties are just one means by which to characterize the usefulness of a polymer resin. The above examples of what is considered an "acceptable", "good", and "best" resin are merely examples and are not meant to represent that no other means exists for determining the usefulness of a polymer resin when there is blended into the resin at least one amorphous thermoplastic polymer. It is also recognized that additional or alternative properties can be important in many applications.

The results achieved herein are surprising because blending polyoxymethylene with other amorphous thermoplastic polymers to create a polyoxymethylene blend having improved properties is known to be difficult. The high level of crystallinity, along with the sensitivity to chemical degradation, the low level of polarity, and the difficulty of making use of chemical reactions in the melt, has made polyoxymethylene one of the least useful plastics as a base resin for blending with other thermoplastic resins. Despite the known difficulties of blending polyoxymethylene with other resins, it was unexpectedly found that polyoxymethylene, when blended with a thermoplastic polyurethane (or even, in some cases, in the absence of the thermoplastic polyurethane component) and at least one amorphous thermoplastic polymer, exhibited a reduced mold shrinkage, one that was, on average, lower than polyoxymethylene alone and lower than polyoxymethylene/polyurethane compositions alone. Further, the ternary blend resulting therefrom also maintained a useful balance of properties.

Specifically, the blends of the present invention consist essentially of (a) 40–98 weight percent of a polyoxymethylene, (b) 1–40 weight percent of a thermoplastic polyurethane, and (c) 1–59 weight percent of at least one amorphous thermoplastic, with said weight percents being based upon the weight of components (a), (b), and (c). Preferably, the blends consist essentially of 45–90 weight percent of the component (a) polyoxymethylene, 5–30 weight percent of the component (b) thermoplastic polyurethane, and 5–50 weight percent of the component (c) at least one amorphous thermoplastic polymer. Most preferably, the blends consist essentially of 50–90 weight percent of the component (a) polyoxymethylene, 5–20 weight percent of the component (b) thermoplastic polyurethane, and 5–45 weight percent of the component (c) at least one amorphous thermoplastic polymer.

It has also been found that the mold shrinkage of polyoxymethylene itself is improved by the addition thereto of at least one amorphous thermoplastic polymer selected from the group consisting of styrene acrylonitrile copolymers, acrylonitrile-butadiene-styrene resins, acrylonitrile-ethylene-propylene-styrene resins, and polycarbonates, wherein the resulting blend consists of 50–95 weight percent polyoxymethylene and 5–50 weight percent amorphous thermoplastic polymer.

1. Component (a) Polyoxymethylene

The component (a) "polyoxymethylene" includes homopolymers of formaldehyde or of cyclic oligomers of formaldehyde, the terminal groups of which are end-capped by esterification or etherification, and copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification.

The polyoxymethylenes used in the blends of the present invention can be branched or linear and will generally have a number average molecular weight in the range of 10,000 to 100,000, preferably 20,000 to 90,000, and more preferably 25,000 to 70,000. The molecular weight can be conveniently measured by gel permeation chromatography in m-cresol at 160° C. using a Du Pont PSM bimodal column kit with nominal pore size of 60 and 1000 A. Although polyoxymethylenes having higher or lower molecular weight averages can be used, depending on the physical and processing properties desired, the polyoxymethylene molecular weight averages mentioned above are preferred to provide optimum balance of good mixing of the various ingredients to be melt blended into the polyoxymethylene blend with the most desired combination of physical properties in the molded articles made from such blends.

As an alternative to characterizing the polyoxymethylene by its number average molecular weight, it can be characterized by its melt flow rate. Polyoxymethylenes which are suitable for use in the blends of the present invention will have a melt flow rate (measured according to ASTM-D-1238, Procedure A, Condition G with a 1.0 mm (0.0413 inch) diameter orifice of 0.1–40 grams/10 minutes. Preferably, the melt flow rate of the polyoxymethylene used in the blends of the present invention will be from 0.5–35 grams/10 minutes. The most preferred polyoxymethylenes are linear polyoxymethylenes with a melt flow rate of about 1–20 gram/10 minutes.

As indicated above, the polyoxymethylene can be either a homopolymer, a copolymer, or a mixture thereof. Copolymers can contain one or more comonomers, such as those generally used in preparing polyoxymethylene compositions. Comonomers more commonly used include alkylene oxides of 2–12 carbon atoms and their cyclic addition products with formaldehyde. The quantity of comonomer will not be more than 20 weight percent, preferably not more than 15 weight percent, and most preferably about 2 weight percent. The most preferred comonomer is ethylene oxide. Generally polyoxymethylene homopolymer is preferred over copolymer because of its greater stiffness and strength. Preferred polyoxymethylene homopolymers include those whose terminal hydroxyl groups have been end-capped by a chemical reaction to form ester or ether groups, preferably acetate or methoxy groups, respectively.

The polyoxymethylene may also contain those additives, ingredients, and modifiers that are known to be added to polyoxymethylene.

2. Component (b) Thermoplastic Polyurethane

The component (b) thermoplastic polyurethanes suited for use in the blends of the present invention can be selected from those commercially available or can be made by processes known in the art. (See, for example, Rubber Technology, 2nd edition, edited by Maurice Morton (1973), Chapter 17, Urethane Elastomers, D. A. Meyer, especially pp. 453–6). Thermoplastic polyurethanes are derived from the reaction of polyester or polyether polyols with diisocyanates and optionally also from the further reaction of such components with chain-extending agents such as low molecular weight polyols, preferably diols, or with diamines to form urea linkages. Thermoplastic polyurethanes are generally composed of soft segments, for example polyether or polyester polyols, and hard segments, usually derived from the reaction of the low molecular weight diols and diisocyanates. While a thermoplastic polyurethane with no hard segments can be used, those most useful will contain both soft and hard segments.

In the preparation of the thermoplastic polyurethanes useful in the blends of the present invention, a polymeric soft segment material having at least about 500 and preferably from about 550 to about 5,000 and most preferably from about 1,000 to about 3,000, such as a dihydric polyester or a polyalkylene ether diol, is reacted with an organic diisocyanate in a ratio such that a substantially linear polyurethane polymer results, although some branching can be present. A diol chain extender having a molecular weight less than about 250 may also be incorporated. The mole ratio of isocyanate to hydroxyl in the polymer is preferably from about 0.95 to 1.08 more preferably 0.95 to 1.05, and most preferably, 0.95 to 1.00. In addition, monofunctional isocyanates or alcohols can be used to control molecular weight of the polyurethane.

Suitable polyester polyols include the polyesterification products of one or more dihydric alcohols with one or more dicarboxylic acids. Suitable polyester polyols also include polycarbonate polyols. Suitable dicarboxylic acids include adipic acid, succinic acid, sebacic acid, suberic acid, methyladipic acid, glutaric acid, pimelic acid, azelaic acid, thiodipropionic acid and citraconic acid and mixtures thereof, including small amounts of aromatic dicarboxylic acids. Suitable dihydric alcohols include ethylene glycol, 1,3- or 1,2-propylene glycol, 1,4-butanediol, 1,3-butanediol, 2-methylpentanediol-1,5, diethylene glycol, 1,5-pentanediol, 1,5-hexanediol, 1,2-dodecanediol, and mixtures thereof.

Further, hydroxycarboxylic acids, lactones, and cyclic carbonates, such as ε-caprolactone and 3-hydroxybutyric acid can be used in the preparation of the polyester.

Preferred polyesters include poly(ethylene adipate), poly(1,4-butylene adipate), mixtures of these adipates, and poly ε caprolactone.

Suitable polyether polyols include the condensation products of one or more alkylene oxides with a small amount of one or more compounds having active hydrogen containing groups, such as water, ethylene glycol, 1,2- or 1,3-propylene glycol, 1,4-butanediol and 1,5-pentanediol and mixtures thereof. Suitable alkylene oxide condensates include those of ethylene oxide, propylene oxide and butylene oxide and mixtures thereof. Suitable polyalkylene ether glycols may also be prepared from tetrahydrofuran. In addition, suitable polyether polyols can contain comonomers, especially as random or block comonomers, ether glycols derived from ethylene oxide, 1,2-propylene oxide and/or tetrahydrofuran (THF). Alternatively, a THF polyether copolymer with minor amounts of 3-methyl THF can also be used.

Preferred polyethers include poly(tetramethylene ether) glycol (PTMEG), poly(propylene oxide) glycol, and copolymers of propylene oxide and ethylene oxide, and copolymers of tetrahydrofuran and ethylene oxide. Other suitable polymeric diols include those which are primarily hydrocarbon in nature, e.g., polybutadiene diol.

Suitable organic diisocyanates include 1,4-butylene diisocyanate, 1,6-hexamethylene diisocyanate, cyclopentylene-1,3-diisocyanate, 4,4'-dicyclohexylmethane diisocyanate, isophorone diisocyanate, cyclohexylene-1,4-diisocyanate, 2,4-tolylene diisocyanate, 2,6-tolylene diisocyanate, isomeric mixtures of 2,4- and 2,6-tolylene diisocyanate, 4,4'-methylene bis(phenylisocyanate), 2,2-diphenylpropane-4,4'-diisocyanate, p-phenylene diisocyanate, m-phenylene diisocyanate, xylyene diisocyanate, 1,4-naphthylene diisocyanate, 1,5-naphthylene diisocyanate, 4,4'-diphenyl diisocyanate, azobenzene-4,4'-diisocyanate, m- or p-tetramethylxylene diisocyanate, and 1-chlorobenzene-2,4-diisocyanate. 4,4'-Methylene bis(phenylisocyanate), 1,6-hexamethylene diisocyanate, 4,4'-dicyclohexylmethane diisocyanate and 2,4-tolylene diisocyanate are preferred.

Secondary amide linkages including those derived from adipyl chloride and piperazine, and secondary urethane linkages, including those derived from the bis-chloroformates of PTMEG and/or butanediol, can also be present in the polyurethanes.

Dihydric alcohols suitable for use as chain extending agents in the preparation of the thermoplastic polyurethanes include those containing carbon chains which are either uninterrupted or which are interrupted by oxygen or sulfur linkages, including 1,2-ethanediol, 1,2-propanediol, isopropyl-a-glyceryl ether, 1,3-propanediol, 1,3-butanediol, 2,2-dimethyl-1,3-propanediol, 2,2-diethyl-1,3-propanediol, 2-ethyl-2-butyl-1,3-propanediol, 2-methyl-2,4-pentanediol, 2,2,4-trimethyl-1,3-pentanediol, 2-ethyl-1,3-hexanediol, 1,4-nutanediol, 2,5-hexanediol, 1,5-pentanediol, dihydroxycyclopentane, 1,6-hexanediol, 1,4-cyclohexanediol, 4,4'-cyclohexanedimethylol, thiodiglycol, diethylene glycol, dipropylene glycol, 2-methyl-1,3-propanediol, 2-methyl-2-ethyl-1,3-propanediol, dihydroxyethyl ether of hydropuinone, hydrogenated bisphenol A, dihydroxyethyl terephthalate and dihydroxymethyl benzene and mixtures thereof. Hydroxyl terminated oligomers of 1,4-butanediol terephthalate can also be used, giving a polyester-urethane-polyester repeating structure. Diamines can also be used as chain extending agents giving urea linkages. 1,4-butanediol, 1,2-ethanediol and 1,6-hexanediol are preferred.

In the preparation of the thermoplastic polyurethanes, the ratio of isocyanate to hydroxyl should be close to unity, and the reaction can be a one step or a two step reaction. Catalyst can be used, and the reaction can be run neat or in a solvent.

The moisture content of the blend, in particular of the thermoplastic polyurethane, can influence the results achieved. Water is known to react with polyurethanes, causing the polyurethane to degrade, thereby lowering the effective molecular weight of the polyurethane and lowering the inherent and melt viscosity of the polyurethane. Accordingly, the drier the better. In any event, the moisture content of the blend, and of the individual components of the blend, should contain less than 0.2 percent by weight of water, preferably less than 0.1 percent, especially when there is no opportunity for the water to escape, for example during an injection molding process and other techniques of melt processing.

The thermoplastic polyurethane can also contain those additives, ingredients, and modifiers known to be added to thermoplastic polyurethane.

3. Component (c) Amorohous Thermoplastic Polymer

Component (c) is at least one amorphous thermoplastic polymer. These amorphous thermoplastic polymers are thermoplastic polymers that are generally used by themselves in extrusion and injection molding processes. These polymers are known to those skilled in the art as extrusion and injection molding grade resins, as opposed to those resins that are known for use as minor components (i.e., processing aids, impact modifiers, stabilizers) in polymer compositions.

By the term "thermoplastic" it is meant that the polymer softens, when heated, to a flowable state in which under pressure it can be forced or transferred from a heated cavity into a cool mold and upon cooling in the mold, it hardens and takes the shape of the mold. Thermoplastic polymers are defined in this manner in the *Handbook of Plastics and Elastomers* (published by McGraw-Hill).

By the term "amorphous", it is meant that the polymer has no distinct crystalline melting point, nor does it have a measurable heat of fusion (although with very slow cooling from the melt, or with of sufficient annealing, some crystallinity may develop). The heat of fusion is conveniently determined on a differential scanning calorimeter (DSC). A suitable calorimeter is the Du Pont Company's 990 thermal analyzer, Part Number 990000 with cell base II, Part Number 990315 and DSC cell, Part Number 900600. With this instrument, heat of fusion can be measured at a heating rate of 20° C. per minute. The sample is alternately heated to a temperature above the anticipated melting point and cooled rapidly by cooling the sample jacket with liquid nitrogen. The heat of fusion is determined on any heating cycle after the first and should be a constant value within experimental error. Amorphous polymers are defined herein as having a heat of fusion, by this method, of less than 1 cal/gram. For reference, semicrystalline 66 nylon polyamide with a molecular weight of about 17,000 has a heat of fusion of about 16 cal/gm.

The amorphous thermoplastic polymers useful in the present compositions must be melt processible at the temperature at which the polyoxymethylene is melt processed. Polyoxymethylene is normally melt processed at melt-temperatures of about 170°–260° C., preferably 185°–240° C., and most preferably 200°–230° C. By "melt processible" it is meant that the amorphous thermoplastic polymer must soften or have a sufficient flow such that it can be melt compounded at the particular melt processing temperature for the polyoxymethylene.

The minimum molecular weight of the amorphous thermoplastic polymer is not considered to be significant for the present blends, provided that the polymer has a degree of polymerization of at least twenty and further provided that the polymer is melt processible (i.e., it flows under pressure) at the temperature at which the polyoxymethylene is melt processed. The maximum molecular weight of the amorphous thermoplastic polymer should not be so high that the amorphous thermoplastic polymer by itself would not be injection moldable by standard present techniques. The maximum molecular weight for a polymer to be used for injection molding processes will vary with each individual, particular amorphous thermoplastic polymer. However, said maximum molecular weight for use in injection molding processes is readily discernible by those skilled in the art.

To realize optimum physical properties for the ternary blend, it is recommended that the polyoxymethylene polymer and the amorphous thermoplastic polymer have matching melt viscosity values under the same conditions of temperature and pressure.

The amorphous thermoplastic polymer can be incorporated into the composition as one amorphous thermoplastic polymer or as a blend of more than one amorphous thermoplastic polymer. Preferably, component (c) consists of one amorphous thermoplastic polymer. Whether it is incorporated as one amorphous thermoplastic polymer or as a blend of more than one, the weight percent of all amorphous thermoplastic polymers in the composition shall not exceed the weight percent ranges given above.

Amorphous thermoplastic polymers, which are injection molding and extrusion grade, suited for use in the blends of the present invention are well known in the art and can be selected from those commercially available or can be made by processes known in the art. Examples of suitable amorphous thermoplastic polymers can be selected from the group consisting of styrene acrylonitrile copolymers (SAN), SAN copolymers toughened with a mostly unsaturated rubber, such as acrylonitrile-butadiene-styrene (ABS) resins, or toughened with a mostly saturated rubber, such as acrylonitrile-ethylene-propylene-styrene resins (AES), polycarbonates, polyamides, polyarylates, polyphenyleneoxides, polyphenylene ethers, high impact styrene resins (HIPS), acrylic polymers, imidized acrylic resins, styrene maleic anhydride copolymers, polysulfones, styrene acrylonitrile maleic anhydride resins, and styrene acrylic copolymers, and derivatives thereof. The preferred amorphous thermoplastic polymers are selected from the group consisting of styrene acrylonitrile copolymers (SAN), SAN copolymers toughened with a mostly unsaturated rubber, such as acrylonitrile-butadiene-styrene (ABS) resins, or toughened with a mostly saturated rubber, such as acrylonitrile-ethylene-propylene-styrene resins (AES), polycarbonates, polyamides, polyphenyleneoxides, polyphenylene ethers, high impact styrene resins (HIPS), acrylic polymers, styrene maleic anhydride copolymers, and polysulfones, and derivatives thereof. The more preferred amorphous thermoplastic polymers are selected from the group consisting of SAN, ABS, AES, polycarbonates, polyamides, HIPS, and acrylic polymers. Most preferred amorphous thermoplastic polymers are SAN copolymers, ABS resins, AES resins, and polycarbonates.

Amorphous thermoplastic SAN copolymers that are useful herein are well known in the art. SAN copolymer is generally a random, amorphous, linear copolymer produced by copolymerizing styrene and acrylonitrile. The preferred SAN copolymer has a minimum molecular weight of 10,000 and consists of 20-40% acrylonitrile, 60-80% styrene. The more preferred SAN copolymer consists of 25-35% acrylonitrile, 65-75% styrene. SAN copolymer is commercially available or it can be readily prepared by techniques well known to those skilled in the art. Amorphous thermoplastic SAN copolymers are further described on pages 214-216 in *Engineering Plastics*, volume 2, published by ASM INTERNATIONAL, Metals Park, Ohio (1988).

Amorphous thermoplastic ABS and AES resins, which are injection molding and extrusion grade resins, that are useful herein are well known in the art. ABS resin is produced by polymerizing acrylonitrile and styrene in the presence of butadiene, or a mostly butadiene, rubber. Preferably, the ABS resin is comprised of 50-95% of a matrix of SAN, with said matrix being comprised of 20-40% acrylonitrile and 60-80% styrene, and 5-50% of a butadiene rubber or a mostly butadiene rubber, such as styrene butadiene rubber (SBR). More preferably, it is comprised of 60-90% of a matrix of SAN, with said matrix more preferably being comprised of 25-35% acrylonitrile and 65-75% styrene, and 10-40% of a butadiene rubber. AES resin is produced by polymerizing acrylonitrile and styrene in the presence of a mostly saturated rubber. The preferred and more preferred AES resin is the same as the preferred and more preferred ABS resin except that the rubber component is comprised of mostly ethylene-propylene copolymer, as opposed to butadiene, or mostly butadiene, rubber. Other alpha-olefins and unsaturated moieties may be present in the ethylene-propylene copolymer rubber. Both ABS and AES copolymers are commercially available or can be readily prepared by techniques well known to those skilled in the art. Amorphous thermoplastic ABS resin is further described on pages 109-114 in *Engineering Plastics*, referenced above.

Amorphous thermoplastic polycarbonates that are useful herein are well known in the art and can be most basically defined as possessing the repetitive carbonate group

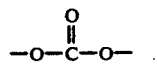

and in addition will always have the

phenylene moiety attached to the carbonate group (cf. U.S. Pat. No. 3,070,563).

Preferably, the polycarbonate can be characterized as possessing recurring structural units of the formula

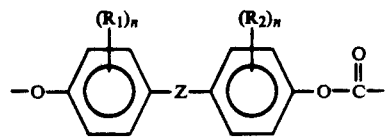

wherein Z is a single bond, an alkylene or alkylidene moiety with 1-7 carbon atoms, a cycloalkylene or cycloalkylidene moiety with 5-12 carbon atoms, —O—, —S—, —CO—, —SO— or —SO$_2$—, preferably methylene or isopropylidene; R$_1$ and R$_2$ are a hydrogen, a halogen, or an alkylene or alkylidene moiety having 1-7 carbon atoms, and n equals 0 to 4.

Amorphous thermoplastic polycarbonates are commercially available or can be readily prepared by techniques well known to those skilled in the art. The most preferred aromatic polycarbonate on the basis of commercial availability and available technical information is the polycarbonate of bis(4-hydroxyphenyl)-2,2-propane, known as bisphenol-A polycarbonate. Amorphous thermoplastic polycarbonate is further described on pages 149-150 of *Engineering Plastics*, referenced above.

Amorphous thermoplastic polyamides that are useful herein are well known in the art. They are described in U.S. Pat. No. 4,410,661. Specifically, these amorphous thermoplastic polyamides are obtained from at least one aromatic dicarboxylic acid containing 8-18 carbon atoms and at least one diamine selected from the class consisting of (i) 2-12 carbon normal aliphatic straight-chained diamine,
(ii) 4-18 carbon branched aliphatic diamine, and
(iii) 8-20 carbon cycloaliphatic diamine containing at least one cycloaliphatic, preferably cyclohexyl, moiety, and wherein optionally, up to 50 weight percent of the amorphous polyamide may consist of units obtained from lactams or omega-aminoacids containing 4-12 carbon atoms, or from polymerization salts of aliphatic dicarboxylic acids containing 4-12 carbon atoms and aliphatic diamines containing 2-12 carbon atoms. By the term "aromatic dicarboxylic acid", it is meant that the carboxy groups are attached directly to an aromatic ring, such as phenylene naphthalene, etc. By the term "aliphatic diamine", it is meant that the amine groups are attached to a nonaromatic-containing chain such as alkylene. By the term "cycloaliphatic diamine", it is meant that the amine groups are attached to a cycloaliphatic ring composed of 3-15 carbon atoms. The 6 carbon cycloaliphatic ring is preferred.

Preferred examples of amorphous thermoplastic polyamides include (a) polyamides obtained from hexamethylene diamine and a mixture of 55-100 weight percent isophthalic acid and 45-0 weight percent terephthalic acid (based on total weight of the acids), (b) polyamides obtained from (i) a mixture of 70-100 weight percent 2,2,4- and/or 2,4,4-trimethylhexamethylene diamine and 30 to 0 weight percent hexamethylene diamine and (ii) 0-100 weight percent terephthalic acid and 100-0 weight percent isophthalic acid, wherein total weight percent diamine refers to total diamines present and weight percent acid referes to total acids present, (c) polyamides obtained from (i) an 8-20 carbon atom cycloaliphatic diamine with at least one cyclohexyl moiety and (ii) a mixture of 50-100 weight percent isophthalic acid and 50-0 weight percent terephthalic acid; and 10-50 weight percent (based on the total weight of polyamide) of a lactam, omega-aminoacids containing 4-12 carbon atoms, or salts of aliphatic dicarboxylic acids containing 4-12 carbon atoms and aliphatic diamines containing 2-12 carbon atoms, (d) polyamides obtained from a mixture of:
 (i) 40-98 mole percent isophthalic acid, based on total acids present,
 (ii) 2-60 mole percent terephthalic acid based on total acids present,
 (iii) 50-98 mole percent hexamethylene diamine, based on total amines present; and
 (iv) 2-50 mole percent, based on total amines present, of at least one aliphatic diamine containing between 8 and 20 carbon atoms and containing at least one cyclohexane nucleus, wherein the mole percent acids present totals 100% and the mole percent amines present totals 100%.

The amorphous thermoplastic polyamides exhibit melt viscosities at 300° C. of less than 50,000 poise, preferably less than 20,000 poise measured at a shear stress of 105 dynes/cm². The amorphous polyamides are commercially available or can be prepared by known polymer condensation methods in the composition ratios mentioned above. In order to form high polymers, the total moles of the diacids employed should approximately equal the total moles of the diamines employed.

Representative preferred cycloaliphatic diamines containing 8-20 carbon atoms and at least one cyclohexyl moiety or nucleus include 1-amine-3-aminomethyl-3,5,5-trimethylcyclohexane, i.e.,

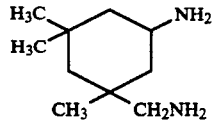

1,3- or 1,4-bis(aminomethyl)cyclohexane, i.e.,

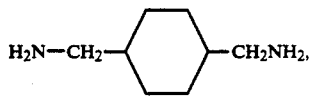

bis(p-aminocyclohexyl)methane, i.e.,

-continued

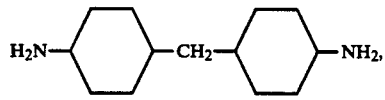

and the like.

As normally made the 1-aminomethyl-3,5,5-trimethylcyclohexane and the 1,3- or 1,4-bis(aminomethyl)cyclohexane are mixtures of the cis and trans isomers. Any isomer ratio may be used in this invention.

Bis(p-aminocyclohexyl)methane (PACM hereinafter), which can be used as one of the diamine components in the amorphous thermoplastic polyamides of this invention, is usually a mixture of three stereoisomers. In this invention, any ratio of the three may be used.

In addition to isophthalic acid and terephthalic acid, derivatives thereof, such as the chlorides, may be used to prepare the amorphous thermoplastic polyamide.

The polymerization to prepare the amorphous thermoplastic polyamides may be performed in accordance with known polymerization techniques, such as melt polymerization, solution polymerization and interfacial polymerization techniques, but it is preferred to conduct the polymerization in accordance with the melt polymerization procedure. This procedure produces polyamides having high molecular weights. In the polymerization, diamines and acids are mixed in such amounts that the ratio of the diamine components and the dicarboxylic acid components will be substantially equimolar. In melt polymerization the components are heated at temperatures higher than the melting point of the resulting polyamide but lower than the degradation temperature thereof. The heating temperature is in the range of about 170° to 300° C. The pressure can be in the range of vacuum to 300 psig. The method of addition of starting monomers is not critical. For example, salts of combinations of the diamines and acids can be made and mixed. It is also possible to disperse a mixture of the diamines in water, add a prescribed amount of a mixture of acids to the dispersion at an elevated temperature to form a solution of a mixture of nylon salts, and subject the solution to the polymerization.

If desired, a monovalent amine or, preferably, an organic acid, may be added as viscosity adjuster to a mixture of starting salts or an aqueous solution thereof.

Amorphous thermoplastic polyarylates that are useful herein are well known in the art and are described in detail in U.S. Pat. No. 4,861,828. Specifically, the amorphous thermoplastic polyarylates used in the compositions of the present invention are aromatic polyesters derived from at least one dihydric phenol or derivative thereof and at least one aromatic dicarboxylic acid or derivative thereof. Each component from which the amorphous thermoplastic polyarylate is derived has a functional group or groups, i.e., hydroxyl or carboxyl, attached directly to an aromatic ring. The dihydric phenol can be a bisphenol as described in U.S. Pat. No. 4,187,358 as structure 1:

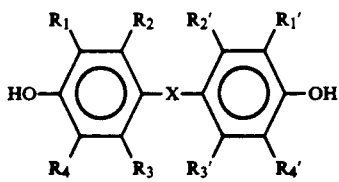

consisting of nothing, —O—, —S—, —SO$_2$—, —SO—, —CO—, an alkylene group containing 1 to 5 carbon atoms and an alkylidene group containing 2 to 7 carbon atoms, and R$_1$, R$_2$, R$_3$, R$_4$, R$_1$', R$_2$', R$_3$' and R$_4$', which may be the same or different, each represents a member selected from the group consisting of a hydrogen atom, a chlorine atom, a bromine atom and an alkyl group containing 1 to 5 carbon atoms, and/or a functional derivative thereof.

Suitable examples of alkylene groups for X containing 1 to 5 carbon atoms include a methylene group, an ethylene group, a propylene group, a tetramethylene group and a pentamethylene group. Suitable examples of alkylidene groups for X containing 2 to 7 carbon atoms include an ethylidene group, a propylidene group, an isopropylidene group, an isobutylidene group, a pentylidene group, a cyclopentylidine group and a cyclohexylidine group. Suitable examples of alkyl groups of R$_1$ to R$_4$ and R$_1$' to R$_4$' containing 1 to 5 carbon atoms include a methyl group, an ethyl group, an isopropyl group, a tert-butyl group, and a neopentyl group.

Additionally, up to 40 mole % of the dihydric aromatic phenols of the formula:

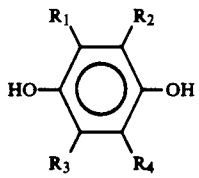

may be used in combination with the bisphenols wherein R$_1$-R$_4$ are as previously described.

Examples of suitable bisphenols are 4,4'-dihydroxydiphenyl ether, bis(4-hydroxy-2-methylphenyl)ether, bis(4-hydroxy-3-chlorophenyl)-ether, bis(4-hydroxyphenyl)sulfide, bis(4-hydroxy-phenyl)sulfone, bis(4-hydroxyphenyl)ketone, bis(4-hydroxyphenyl)methane, bis(4-hydroxy-3,5-dichlorophenyl)-methane, 1,1-bis(4-hydroxyphenyl)-ethane, 2,2-bis(4-hydroxy-3-chlorophenyl)propane, 2,2-bis(4-hydroxy-3,5-dibromophenyl)propane, 3,3,3',3'-tetramethyl spirobis-1,1'-indane-6,6'-diol and 1,1-bis(4-hydroxyphenyl)-n-butane. 2,2-Bis(4-hydroxyphenyl)propane, which is bispehnol A, is most preferred.

Typical examples of the functional derivatives of the bisphenol which can be used are the alkali metal salts and diesters with aliphatic monocarboxylic acid containing 1 to 3 carbon atoms. Suitable examples of aliphatic monocarboxylic acids include formic acid, acetic acid, propionic acid, etc. Preferred functional derivatives of the bisphenols are the sodium salts, the potassium salts, and the diacetate esters.

The bisphenol can be used either individually or as a mixture of two or more. Further, mixed salts or mixed carboxylate esters may be used.

Preferably, a mixture of 60 to 0 mole % of terephthalic acid and/or the functional derivatives thereof and 40 to 100 mole % of isophthalic acid and/or its functional derivatives is used as the acid component to be reacted with the bisphenol to prepare the polyarylate used in the compositions of the present invention. More preferably, a mixture of 0 to 50 mole % of terephthalic acid and/or the functional derivatives thereof and 100 to 50 mole % of isophthalic acid and/or the functional derivatives thereof is used. The molar ratio of the bisphenol to the sum of the terephthalic acid units and isophthalic acid units is substantially equimolar, e.g., about 1:0.95 to 1.2, preferably about 1:1, most preferably 1:1. Aromatic hydroxy acids such a hydroxy benzoic or hydroxy naphthoic acid and other dicarboxylic acids (both aromatic and aliphatic) can also be incorporated into the polyarylate structure as a minor component.

Examples of functional derivatives of terephthalic or isophthalic acid which can be used in this invention include acid halides and diaryl esters. Preferred examples of acid halides include terephthaloyl dichloride, isophthaloyl dichloride, terephthaloyl dibromide and isophthaloyl dibromide. Preferred examples of diaryl esters include diphenyl terephthalate and diphenyl isophthalate.

In the preparation of the amorphous thermoplastic polyarylate, at most 50 mole %, preferably at most 25 mole %, of a compound having a carbonate linkage such as diphenyl carbonate or an aliphatic glycol such as ethylene glycol, propylene glycol, tetramethylene glycol or neopentyl glycol may also be copolymerized therewith to improve the molding characteristics. To change the reactivity and possibly the stability of the polyarylate, monofunctional components can be included in the polyarylate to limit molecular weight or reduce the proportions of reactive ends.

Amorphous thermoplastic polyarylates useful in the compositions of the present invention are commercially available or can be prepared by any of several known methods. The interfacial polymerization method comprises mixing a solution of an aromatic dicarboxylic acid chloride in a water-immiscible organic solvent with an alkaline aqueous solution of bisphenol. The solution polymerization method comprises heating bisphenol and a diacid dichloride in an organic solvent. One melt polymerization method comprises heating a diphenyl ester or an aromatic dicarboxylic acid and bisphenol. An alternate melt polymerization method comprises heating aromatic dicarboxylic acid and a diester (e.g., the diacetate ester) of bisphenol. These methods are described in detail in U.S. Pat. Nos. 3,884,990, 3,946,091, 4,052,481 and 4,485,230.

In order to insure good physical properties in the blends of the present invention, the amorphous thermoplastic polyarylate should have a logarithmic viscosity number ($\eta$inh or IV), defined by the following equation, of about 0.35 to about 1.5, preferably 0.40 to 0.65

$$\eta inh = \frac{\ln t_1/t_2}{C}$$

wherein $t_1$ is the falling time (in seconds) of a solution of the polyarylate, $t_2$ is the falling time (in seconds) of the solvent; and C is the concentration (g/dl) of the polyarylate in the solution. The logarithmic viscosity number used herein is determined in a trifluoroacetic acid-methylene chloride mixture (25/75 by volume) at 30° C. The procedure is further described in Textbook of Polymer Science by F. Billmeyer, p. 79 (John Wiley & Sons, 1962).

Amorphous thermoplastic polyphenylene ethers (PPE) and polyphenylene oxides (PPO) that are useful herein are known in the art. PPE homopolymer is frequently referred to as PPO. The chemical composition of the homopolymer is poly(2,6-dimethyl-4,4-phenylene ether) or poly(oxy-(2-6-dimethyl-4,4-phenylene)):

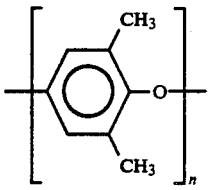

The chemical composition of PPE, which is a copolymer, is shown as

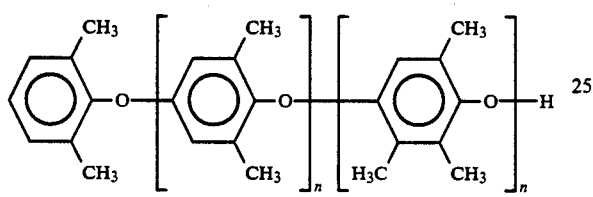

Both PPE and PPO are further described on pages 183-185 in *Engineering Plastics*, referenced above. Both PPE and PPO are commercially available or can be readily prepared by known techniques by those skilled in the art.

Amorphous thermoplastic high impact styrene (HIPS) resins that are useful herein are well known in the art. HIPS is produced by dissolving usually less than 20 percent polybutadiene rubber, or other unsaturated rubber, in styrene monomer before initiating the polymerization reaction. Polystyrene forms the continuous phase of the polymer and the rubber phase exists as discrete particles having occlusions of polystyrene. HIPS resin is further described on pages 194-199 in *Engineering Plastics*, referenced above. HIPS resins are commercially available or can be readily prepared from known techniques by those skilled in the art.

Amorphous thermoplastic polymers of acrylics, which are extrusion and injection molding grade, that are useful herein are well known in the art. Amorphous thermoplastic acrylic polymers comprise a broad array of polymers in which the major monomeric constituents belong to two families of ester-acrylates and methacrylates. Amorphous thermoplastic acrylic polymers are described on pages 103-108 in *Engineering Plastics*, referenced above. The molecular weight of the amorphous thermoplastic polymer of acrylics, for it to be injection moldable by standard present techniques, should not be greater than 200,000. Amorphous thermoplastic acrylic polymers are commercially available or can be readily prepared from known techniques by those skilled in the art.

Amorphous thermoplastic imidized acrylic resins that are useful herein are well known in the art. Amorphous thermoplastic imidized acrylic resins are prepared by reacting ammonia, or a primary amine, with an acrylic polymer, such as polymethyl methacrylate, to form the imidized acrylic resin (also known as polyglutarimides).

Amorphous thermoplastic imidized acrylic resins generally have the formula

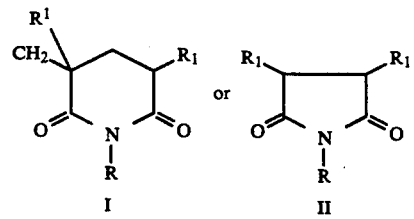

where R is a hydrogen or hydrocarbyl of 1-20 carbon atoms, preferably alkyl or aryl, and preferably of 1-10 carbon atoms; and $R_1$ is $-CH_3$ or $-H$. The resins of formula I are generally produced from acrylate or methacrylate ester homo- or co-polymers by reacting ammonia or alkyl- or aryl-amines with the polymer, which contains recurring units of

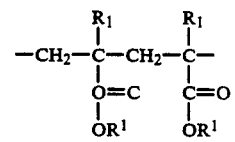

where $R^1$ is a lower alkyl, and $R_1$ is $CH_3$ or H. When copolymers are used, they preferably contain at least 40% by weight methacrylate or acrylate units.

The resins of Formula II can be prepared by polymerizing acrylic monomers with ethylenically unsaturated maleimides, such as N-phenyl maleimide.

The imidized acrylic resin will contain at least about 10% imide groups and preferably at least about 40% imide groups, and can be prepared as described, for example, in U.S. Pat. No. 4,246,374 and in U.K. Patent 2101139B. Representative imide polymers include imidized poly(methyl methacrylate) or poly(methyl acrylate), imidized copolymers of either methyl methacrylate or methyl acrylate and comonomers such as butadiene, styrene, ethylene, methacrylic acid, or the like.

Amorphous thermoplastic imidized acrylic resins are also described in U.S. Ser. No. 06/476,092, now U.S. Pat. No. 4,874,817 which was allowed on May 26, 1989. Amorphous thermoplastic imidized acrylics are commercially available or can be readily prepared from known techniques by those skilled in the art.

Amorphous thermoplastic copolymers of styrene maleic anhydride that are useful herein are well known in the art. Styrene maleic anhydride copolymers are produced by the reaction of styrene monomer with smaller amounts of maleic anhydride. The structure of styrene maleic anhydride copolymer is as follows:

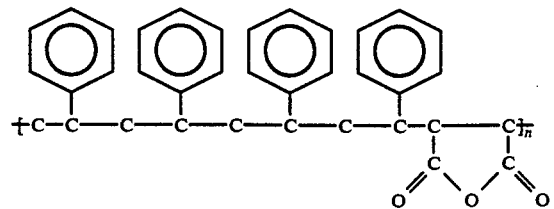

Amorphous thermoplastic styrene maleic anhydride copolymers are further described on pages 217-221 in *Engineering Plastics*, referenced above. They are commercially available or can be prepared from known techniques by those skilled in the art.

Amorphous thermoplastic polysulfones that are useful herein are well known in the art. The chemical repeat unit of polysulfone is shown below:

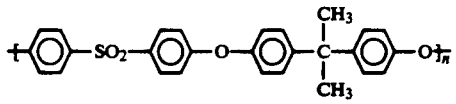

It is produced from bisphenol A and 4,4'-dichlorodiphenylsulfone by nucleophilic displacement chemistry. It is further described on pages 200–202 in *Engineering Plastics*, referenced above. Polysulfone is commercially available or can be readily prepared from known techniques by those skilled in the art.

Amorphous thermoplastic styrene acrylonitrile maleic anhydride copolymers and styrene acrylic copolymers that are useful herein are known in the art. They are commercially available or can be prepared from known techniques by those skilled in the art.

The amorphous thermoplastic polymers may also contain those additional ingredients, modifiers, stabilizers, and additives commonly included in such polymers.

It is noted here that the addition of any of styrene acrylonitrile copolymers, acrylonitrile-butadiene-styrene copolymers, acrylonitrile-ethylene-butadiene-styrene copolymers, and polycarbonates to polyoxymethylene alone reduces the mold shrinkage of the polyoxymethylene.

4. Preparation of Ternary Blends

It should be understood that the blends of the present invention can include, in addition to the polyoxymethylene, the thermoplastic polyurethane, and the amorphous, thermoplastic polymer, other additives, modifiers, and ingredients as are generally used in polyoxymethylene molding resins, including stabilizers and co-stabilizers (such as those disclosed in U.S. Pat. Nos. 3,960,984; 4,098,843; 4,766,168; 4,814,397; 5,011,890; and 5,063,263), antioxidants, pigments, colorants, UV stabilizers, toughening agents, nucleating agents, glass, minerals, lubricants, fibers, reinforcing agents, and fillers. It should also be understood that some pigments and colorants can, themselves, adversely affect the stability of polyoxymethylene compositions but that the physical properties should remain relatively unaffected. Preferred thermal stabilizers are described in U.S. Pat. No. 5,011,890, with polyacrylamide being most preferred.

It is noted that polyoxymethylene polymer can be readily de-stabilized by compounds or impurities known to de-stabilize polyoxymethylene. Therefore, although it is not expected that the presence of these components or impurities in the present blends will exert a major influence on the mold shrinkage property or other physical properties of the blend, it is recommended that if maximum stability, such as oxidative or thermal stability, is desired for the blend, then the components of the blend, along with any additives, modifiers, or other ingredients, should be substantially free of these compounds or impurities. Specifically, for blends containing ester-capped or partially ester-capped polyoxymethylene homopolymer, stability will be increased as the level of basic materials in the individual components and other ingredients/additives/modifiers of the blend is decreased. It is further noted that polyoxymethylene copolymer or homopolymer that is substantially all ether-capped can tolerate higher concentrations of basic materials without decreasing stability than can ester-capped or partially ester-capped polyoxymethylene homopolymer. Further, and again for maximum stability, but not for the retention of physical properties, blends containing either homopolymer or copolymer polyoxymethylene will have increased stability as the level of acidic impurities in the individual components and other ingredients/additives/modifiers of the blend is decreased.

Polyoxymethylene, as stated above, possesses good solvent resistance. It is recommended that if it is desired to maintain the solvent resistance qualities of polyoxymethylene, then the polyoxymethylene in the ternary blend should be in a continuous phase. The thermoplastic polyurethane and the amorphous thermoplastic polymer can be in a continuous or discontinuous phase in the ternary blend. The melt viscosity of the polyoxymethylene relative to the other components can influence whether it will or will not be a continuous phase in the blend at certain volume ratios. Whether or not the polyoxymethylene is in a continuous phase in the ternary blend can be determined by standard techniques of electron microscopy or by standard procedures using selected solvents to dissolve away certain phases, leaving the other phase(s) for visual inspection and/or microscopic inspection. Solvent resistance can be measured by techniques known to those skilled in the art, such as by determining stress cracking or surface softening.

The blends of the present invention are preferably prepared by tumbling or mixing together pellets, or some other similar article, of the individual components, and then intimately melt blending the mixture in an intensive mixing device. The same can be done with a polyoxymethylene/polyurethane pellet to be blended with the component (c) amorphous thermoplastic polymer. In other words, the components may be mixed and melt blended together individually or the component (c) amorphous thermoplastic polymer can be mixed and melt-blended with polyoxymethylene/polyurethane pellets or other similar articles. It is also possible to prepare the blends by melting and mixing pellets of each individual component, or of the polyoxymethylene/thermoplastic polyurethane composition with pellets of the amorphous thermoplastic polymer, in a molding machine, provided sufficient mixing can occur in the molding machine.

Regardless of the method used to make the blend, melt blending should be done by any intensive mixing device capable of developing high shear at temperatures above the softening points of the individual components, but also at temperatures below which significant degradation of the polymer blend components will occur. Examples of such devices include rubber mills, internal mixers such as "Banbury" and "Brabander" mixers, single or multiblade internal mixers with a cavity heated externally or by friction, "Ko-kneaders", multibarrel mixers such as "Farrell Continuous Mixers", injection molding machines, and extruders, both single screw and twin screw, both co-rotating and counter rotating. These devices can be used alone or in combination with static mixers, mixing torpedoes and/or various devices to increase internal pressure and/or the intensity of mixing such as valves, gates, or screws designed for this purpose. It is preferred to use a mixing device that will achieve intimate mixing the the greatest efficiency, consistency and evenness. Accordingly, continuous devices are preferred; and twin screw extruders, particularly those incorporating high intensity mixing sections such as reverse pitch elements and kneading elements, are especially preferred.

Generally, the temperature at which the blends are prepared is the temperature at which polyoxymethylene is melt processed. Polyoxymethylene is usually melt processed at 170°-260° C., with 185°-240° C. being more preferred, and 200°-230° C. being most preferred. Melt processing temperatures below 170° C. or above 260° C. are possible if throughput is adjusted to compensate and if unmelted or decomposed product is not produced.

Shaped articles made from blends of the present invention can be made by any of several common methods, including compression molding, injection molding, extrusion, blow molding, melt spinning and thermoforming. Injection molding is especially preferred. Examples of shaped articles include sheet, profiles, rod stock, film, filaments, fibers, strapping, tape, tubing and pipe. Such shaped articles can be post treated by orientation, stretching, coating, annealing, painting, laminating and plating. Articles of the present invention can be ground and remolded.

Generally, the conditions used in the preparation of shaped articles will be similar to those described above for melt compounding. More specifically, melt temperatures and residence times can be used up the points at which significant degradation of the composition occurs. Preferably, the melt temperature will be about 170°-250° C., more preferably about 185°-240° C., and most preferably about 200°-230° C. Generally, the mold temperature will be 10°-120° C., preferably 10°-100° C., and most preferably the mold temperature will be about 50°-90° C. Generally, total hold-up time in the melt will be about 3-15 minutes, with the shorter times being preferred, consistent with giving a high quality shaped article. If the total hold-up time in the melt is too long, the various phases can degrade and/or coalesce. As an example, the standard 0.32 cm (⅛ in) thick test specimen used in the Izod tests reported later in this application were, unless otherwise specified, prepared in a 1.5 ounce "Arburg" reciprocating screw injection molding machine, model 221-76-350 using cylinder temperature settings between 180° C.-210° C., with a mold temperature of 60° C., a back pressure of 0.3 MPa (50 psi), a screw speed of 120 rpm, a cycle of between 25-45 seconds injection/15 seconds hold, a ram speed of about 0.5-3 seconds, a mold pressure of 8-14 kpsi, and a general purpose screw. Total hold-up time of the melt was estimated to be about five minutes. Samples were allowed to stand for at least three days between molding and testing.

EXAMPLES

In the following examples, there are shown specific embodiments of the present invention and certain side-by comparisons with embodiments of control experiments where one or more of the parameters discussed above was chosen outside the range defining the limits of the present invention. It will be seen that the blends of the present invention are characterized by improved mold shrinkage in comparison to the control blends. The blends of the present invention are also shown to have at least an acceptable balance of physical properties. All parts and percentages are by weight, and all temperatures are in degrees Celsius unless otherwise specified. Measurements not originally in SI units have been so converted and rounded where appropriate.

The mixing device used in all of the examples of the present application, unless noted otherwise, is a 28 mm co-rotating Werner and Pfleiderer twin screw extruder, using a screw design containing two working sections with a total of five kneading elements (75 mm total), two reverse elements (24 mm total), and a vacuum port at about 70% of the distance from the feed throat to the die. It is noted that the design of the screw is not critical to the present invention. All zones were set at 190° C. Temperature of the melt coming out of the die was about 220°-260° C. A low flow of cooling water was used to reduce temperatures in some cases. The extruder was operated at 100-200 rpm with 10-25 pounds per hour throughput. A nitrogen blanket was maintained over the feed throat to exclude oxygen and insure dryness of the ingredients, and the strand exiting the die was quenched in water and cut into pellets. The melt temperatures indicated are estimates based upon measurements taken as the melt exited the die. Depending on the extruder configuration, there can be significant cooling between the last point of mixing and the die. Actual melt temperatures may have been somewhat higher.

The blends in the following examples consist of a polyoxymethylene component, a thermoplastic polyurethane component, and at least one amorphous thermoplastic polymer component. Also included in the examples are compositions of polyoxymethylene and an amorphous thermoplastic polymer. Polyoxymethylene controls, polyoxymethylene/thermoplastic polyurethane controls, and amorphous thermoplastic polymer controls are also included. Each individual component and blend is described below.

Polyoxymethylene Polymer

Polyoxymethylene polymers A, B, and C, used in the following examples, were acetate end-capped homopolymers prepared according to U.S. Pat. No. 2,998,409. Unless otherwise specified, polyoxymethylenes A, B, and C each contained less than one weight percent of a 33/23/43 terpolymer of nylon 66, nylon 6/10, and nylon 6, respectively, and less than one weight percent of a phenolic antioxidant. Polyoxymethylene A had a number average molecular weight of about 65,000. Polyoxymethylene B had a number average molecular weight of about 35,000. Polyoxymethylene C had a number average molecular weight of about 30,000.

Polyoxymethylene D was a polyoxymethylene copolymer sold commercially as Celcon ® M25-04 (manufactured by Celanese) It had a number average molecular weight of about 56,000 and a melt flow rate of about 2.5 g/10 min., measured in accordance with ASTM D-1238.

It is noted that the use of stabilizers and antioxidants is not necessary for the operability of the present invention. They were used in the following examples to improve thermal and oxidative stability and they do not exert a major influence on the mold shrinkage, and other physical properties, of the blends tested.

Thermoplastic Polyurethane

The thermoplastic polyurethane A used in the blends of the examples below had an inherent viscosity of 1.33, a soft segment glass transition temperature (Tg) of −35° C., and was comprised of 37% adipic acid, 39% butanediol, and 24% 4,4'-methylene bisphenyl isocyanate. Inherent viscosity was measured by ASTM D-2857 with a "Schott" automatic viscometer at 0.1% polyurethane in dimethyl formamide at 30° C. The Tg was determined using a Du Pont Model 981 Dynamic Mechanical Analysis Cell attached to a Model 990 DTA instrument. The cell was modified to use liquid nitrogen as the coolant and to allow the use of a 3.2 cm (1.25 inch) gap holding the specimen. The oscillation amplitude was set at 0.2 mm. A heating rate of 2.5° C./min was used from 170° C. to 0° to 40° C. depending on the signal amplitude. Readings were taken every 1° C. increment. The storage and loss moduli were plotted and the major loss modulus peak was defined as the soft segment glass transition temperature.

Amorphous Thermoplastic Polymer

Unless otherwise specified, the melt viscosity data on the amorphous thermoplastic polymer component used in the blends of the examples below was obtained at 220° C., at shear rates of 100 1/sec and 1000 1/sec. The viscosity data for the individual amorphous thermoplastic polymers used in the examples is reported firstly for a shear rate of 100 1/sec and secondly for a shear rate of 1000 1/sec. Glass transition temperatures, where reported, were measured by standard techniques of Differential Scanning Calorimetry. The individual amorphous thermoplastic polymeric components used in the examples are described as follows:

SAN-A was a styrene acrylonitrile copolymer having a melt viscosity of 934 and 241, respectively, and consisting of 30% acrylonitrile, 70% styrene.

SAN-B was a styrene acrylonitrile copolymer having a melt viscosity of 1713 and 329, respectively, and consisting of 29% acrylonitrile, 71% styrene.

SAN-C was a styrene acrylonitrile copolymer having a melt viscosity of 1338 and 275, respectively, and consisting of 24% acrylonitrile, 76% styrene.

AES-A was an acrylonitrile-ethylene-propylene-styrene resin having a melt viscosity of 1660 and 360, respectively, and consisting of 55% styrene, 21% acrylonitrile, and 24% ethylene propylene rubber.

AES-B was an acrylonitrile-ethylene-propylene-styrene resin having a melt viscosity of 1530 and 352, respectively, and consisting of 56% styrene, 22% acrylonitrile, and 22% ethylene propylene rubber.

AES-C was an acrylonitrile-ethylene-propylene-styrene resin having a melt viscosity of 1841 and 363, respectively, and consisting of 51% styrene, 21% acrylonitrile, and 28% ethylene propylene rubber.

ABS-A was an acrylonitrile-butadiene-styrene resin having a melt viscosity of 1081 and 223, respectively, and consisting of 77% styrene, 18% acrylonitrile, and 5% butadiene.

PC-A was a polycarbonate of bisphenol A having a melt viscosity of 905, measured at a shear rate of 100 1/sec at 280° C., and 493, measured at a shear rate of 1000 1/sec at 280° C.

PC-B was a polycarbonate of bisphenol A having a melt viscosity of 505, measured at a shear rate of 100 1/sec at 280° C., and 356, measured at a shear rate of 1000 1/sec at 280° C.

PC-C was a polycarbonate of bisphenol A having a melt viscosity of 218 Pascal seconds, measured at a shear rate of 250 sec$^{-1}$ at 280° C. and 187 Pascal seconds, measured at a shear rate of 1000 sec$^{-1}$ at 280° C.

PAm was an amorphous thermoplastic polyamide of 16% of an elastomeric modifier in 4,4' diamine dicyclohexyl methane (PACM). The elastomeric modifier was an ethylene polymer grafted with fumaric acid (as disclosed in U.S. Pat. No. 4,026,967) and is described as follows: ethylene polymer=EPDM, acid no. (meq/g) =0.27, melt index (g/10min)=0.13. EpDM is an ethylene/propylene/1,4-hexadiene/norbornadiene (68/26/6.3/0.15) tetrapolymer. Melt index was determined in accordance with ASTM D-1238, condition E.

HIPS was a high impact styrene polymer having a melt viscosity of 308, measured at a shear rate of 100 1/sec at 280° C., and 72, measured at a shear rate of 1000 1/sec at 280° C.

PAr was a polyarylate containing 5% ethylene/butyl acrylate/ glycidyl methacrylate terpolymer and having a melt viscosity of 500, measured at a shear rate of 1000 1/sec at 330° C. It had a Tg of about 170° C.

PC/SA was a 70:30 blend of polycarbonate and styrene acrylonitrile polymer having a melt viscosity of 2442 and 524, respectively.

MMA was a methyl methacrylate polymer containing 4% styrene, 7% ethyl acrylate, and 89% methyl methacrylate. It had a melt viscosity of 1172 and 355, respectively.

IA was an imidized acrylic of 85% glutarimide and 15% methyl methacrylate and it had a number average molecular weight of about 60,000.

MP was a modified polyphenylene oxide blend comprised of 66% polystyrene, 30% polyphenylene oxide, and 4% butadiene rubber. It had a Tg, measured as described above, of 149° C. and it had a melt viscosity, at a shear rate of 100 1/sec and 280° C., of 1831 and, at a shear rate of 1000 1/sec and 280° C., of 429.

SMA was a styrene-maleic anhydride polymer consisting of 71% styrene and 13% maleic anhydride and having a melt viscosity of 1104 and 221, measured at 240° C. and a shear rate of 100 1/sec and 1000 1/sec, respectively. The Tg, measured as described above, was 136° C.

PSu was a polysulfone polymer of bisphenol A and p,p'-dichlorodiphenylsulfone and having a glass transition temperature, measured as described above, of 185° C. It had a melt flow of 8 g/10 min at 343° C. (ASTM D1238) from a 2.10 mm oriface under 298 kPa.

PPE was a polyphenylene ether polymer having a glass transition temperature of about 220° C.

Tests

The compositions of the examples that follow were all tested for mold shrinkage, stiffness, elongation, and toughness.

Mold shrinkage was determined on bars molded from the melt-compounded blends. Unless otherwise specified, the pellets of the melt-compounded blend were loaded into a 1.5 ounce "Arburg" reciprocating screw injection molding machine, model 221-75-350 using cylinder temperature settings of about 180° C.-210° C. on the rear, center, front, and nozzle (generally, between 180° C.-210° C. on the rear, center, and front and between 190° C.-210° C. on the nozzle), with a mold temperature of 60° C., a back pressure of 0.3 MPa (50 psi), a screw speed of 120 rpm, a cycle of 25–45 seconds injection/15 seconds hold, ram speed between about 0.5-3 seconds, mold pressure 8–14 kpsi, and a general purpose screw. Total hold-up time of the melt was estimated to be about five minutes. The melted blend was injection molded into standard 12.7 cm×1.27 cm×0.32 cm (5 in×½ in×⅛ in) test bars that are used in measuring "Izod" toughness (according to ASTM- 0256, Method A). The length of the mold was measured The sample blend was allowed to stand in the test bar mold three days at room temperature, after which time the molded sample bar was removed and its length was measured. Mold shrinkage was determined by the following formula:

$$\text{Mold Shrinkage} = \left[\frac{\text{mold length} - \text{molded sample bar length}}{\text{mold length}}\right](100)$$

The value reported is the average of the value obtained for three test bars.

In the examples that follow, the conditions at which the molded test bars were prepared were held as constant as possible, regardless of sample composition. However, for some samples, higher mold pressures, ram speeds, and/or melt temperatures were required to completely fill the mold cavity with the molten sample. These samples, for which mold conditions were varied from the general conditions above, have been indicated in the tables that follow. It was necessary to change the general conditions under which the molded test bars were prepared when the glass transition temperature of the amorphous thermoplastic polymer in the sample was high (i.e., greater than about 150° C.) and thereby was close to the processing temperature of the sample. A high melt viscosity often results when an amorphous resin is processed close to its glass transition temperature. (For reference, amorphous resins are generally processed about 100° C. above their glass transition temperature.) The higher the melt viscosity of the blend, the more likely that higher temperatures, pressures, and/or ram speeds will be needed to fill the mold cavity with the molten blend.

Stiffness was determined by measuring the flexural modulus of the composition. Flexural Modulus was determined in accord with ASTM 790, Geometry A, Method A on three molded sample bars and the average value is reported. Samples were allowed to stand three days at room temperature after molding and prior to testing.

Elongation was measured in accordance with ASTM-D638 at 2"/min. Samples were allowed to stand three days at room temperature after molding and prior to testing. The value reported is the average of the value obtained on three test bars.

Toughness, reported as "Izod", was measured according to ASTM D-256, Method A. Samples were notched using a single toothed cutting wheel on a TMI Notching Cutter Model 43-15 with a cutter speed setting of 10.0 and a feed speed setting of 6.0. The samples were allowed to stand at room temperature three days after molding prior to testing. Since the relative humidity does not effect the physical properties of the sample significantly, no effort was made to control the specimens moisture content. Sample bars were prepared as for the mold shrinkage test, i.e., from a 12.7 cm×1.27 cm×0.32 cm (5 in×½×⅛ in) injection molded bar. The sample bar was cut in half with a notch in each half cut approximately 3.1 cm (1¼ in) from each end. Six samples of each composition were tested at room temperature and the average value was reported.

EXAMPLES IA–IG. BLENDS OF POLYOXYMETHYLENE/THERMOPLASTIC POLYURETHANE/STYRENE ACRYLONITRILE COPOLYMER

Examples IA–IG, the data for which is reported in Tables IA–IG, along with corresponding controls, relate to blends containing a polyoxymethylene, a thermoplastic polyurethane, and an amorphous thermoplastic styrene acrylonitrile copolymer. In all examples, the mold shrinkage of a polyoxymethylene/thermoplastic polyurethane composition was reduced and improved when the styrene acrylonitrile copolymer was blended into the composition. The improvement in mold shrinkage was attained regardless of the particular polyoxymethylene or the particular styrene acrylonitrile used in the blend of the example. Further, the ternary blends of the examples all have at least an acceptable balance of properties for use as a thermoplastic resin. It is further shown that the mold shrinkage of polyoxymethylene alone was improved with the addition thereto of styrene acrylonitrile copolymer.

TABLE IA

Blends of Polyoxymethylene A/Thermoplastic Polyurethane A/Styrene Acrylonitrile A (SAN-A)

| Example No. | Wt % POM | Wt % TPU | Wt % SAN-A | Flexural Modulus (kpsi) | Elongation (%) | Izod (ft-lb/in) | Mold Shrinkage (%) |
|---|---|---|---|---|---|---|---|
| Control1 | — | — | 100A | 561 | 4.8 | 0.4 | 0.28 |
| Control2 | 100A | — | — | 360 | 32.0 | 2.3 | 1.72 |
| Control3 | 70A | 30A | — | 183 | 80.0 | 23.0 | 1.24 |
| IA-1 | 75A | — | 25A | 125 | 10.5 | 0.9 | 1.05 |
| IA-2 | 40A | 15A | 45A | 393 | 23.0 | 2.2 | 0.52 |
| IA-3 | 40A | 15A | 45A | 381 | 38.0 | 2.0 | 0.47 |
| IA-4 | 45A | 15A | 40A | 406 | 18.0 | 2.8 | 0.75 |
| IA-5 | 50A | 10A | 40A | 411 | 12.0 | 1.9 | 0.69 |
| IA-6 | 60A | 5A | 35A | 468 | 7.2 | 1.3 | 0.97 |
| IA-7 | 60A | 10A | 30A | 382 | 12.0 | 1.9 | 0.86 |
| IA-8 | 60A | 20A | 20A | 266 | 170.0 | 5.6 | 0.86 |

POM = polyoxymethylene
TPU = thermoplastic polyurethane

TABLE IB

Blends of Polyoxymethylene A/Thermoplastic Polyurethane A/Styrene Acrylonitrile B (SAN-B)

| Example No. | Wt % POM | Wt % TPU | Wt % SAN-B | Flexural Modulus (kpsi) | Elongation (%) | Izod (ft-lb/in) | Mold Shrinkage (%) |
|---|---|---|---|---|---|---|---|
| Control4 | — | — | 100B | 590 | 3.0 | 0.5 | 0.50 |
| Control5 | 100A | — | — | 360 | 32.0 | 2.3 | 1.72 |
| Control6 | 70A | 30A | — | 183 | 80.0 | 23.0 | 1.24 |
| IB-1 | 50A | — | 50B | 411 | 5.0 | 0.8 | 0.60 |
| IB-2 | 45A | 15A | 40B | 281 | 40.0 | 2.4 | 0.57 |

POM = polyoxymethylene
TPU = thermoplastic polyurethane

TABLE IC

Blends of Polyoxymethylene A/Thermoplastic Polyurethane A/Styrene Acrylonitrile C (SAN-C)

| Example No. | Wt % POM | Wt % TPU | Wt % SAN | Flexural Modulus (kpsi) | Elongation (%) | Izod (ft-lb/in) | Mold Shrinkage (%) |
|---|---|---|---|---|---|---|---|
| Control7 | — | — | 100C | 482 | 7.2 | 0.8 | 0.32 |
| Control8 | 100A | — | — | 360 | 32.0 | 2.3 | 1.72 |
| Control9 | 70A | 30A | — | 183 | 80.0 | 23.0 | 1.24 |
| IC-1* | 75A | — | 25C | 411 | 10.0 | 1.3 | 0.94 |
| IC-2 | 50A | — | 50C | 423 | 5.0 | 0.8 | 0.60 |
| IC-3* | 40A | 20A | 40C | 290 | 62.0 | 3.5 | 0.59 |
| IC-4 | 45A | 15A | 40C | 308 | 34.0 | 1.9 | 0.55 |
| IC-5* | 50A | 10A | 40C | 357 | 19.0 | 1.9 | 0.64 |
| IC-6* | 55A | 15A | 35C | 316 | 28.0 | 3.2 | 0.77 |
| IC-7 | 60A | 5A | 35C | 384 | 10.0 | 1.4 | 0.84 |
| IC-8 | 40A | 30A | 30C | 244 | 80.0 | 16.2 | 0.52 |
| IC-9 | 50A | 20A | 30C | 293 | N/A | 3.4 | 0.35 |
| IC-10 | 50A | 30A | 20C | 244 | N/A | 16.2 | 0.65 |
| IC-11 | 50A | 30A | 20C | 200 | 195.0 | 20.0 | 0.75 |
| IC-12* | 70A | 15A | 15C | 256 | 32.0 | 4.6 | 1.18 |

N/A = not available
POM = polyoxymethylene
TPU = thermoplastic polyurethane
* = mold pressure 15 kpsi

TABLE ID

Blends of Polyoxymethylene B/Thermoplastic Polyurethane A/Styrene Acrylonitrile A (SAN-A)

| Example No. | Wt % POM | Wt % TPU | Wt % SAN-A | Flexural Modulus (kpsi) | Elongation (%) | Izod (ft-lb/in) | Mold Shrinkage (%) |
|---|---|---|---|---|---|---|---|
| Control10 | — | — | 100A | 561 | 3.0 | 0.5 | 0.50 |
| Control11 | 100B | — | — | 440 | 48.0 | 2.4 | 1.56 |
| Control12 | 90B | 10A | — | 333 | 61.0 | 3.6 | 1.62 |
| ID-1 | 50B | — | 50A | 513 | 4.0 | 0.7 | 0.59 |
| ID-2 | 40B | 15A | 45A | 396 | 9.0 | 0.9 | 0.60 |
| ID-3 | 45B | 10A | 45A | 436 | 7.0 | 1.2 | 0.54 |
| ID-4 | 50B | 5A | 45A | 487 | 4.0 | 1.0 | 0.74 |
| ID-5 | 40B | 20A | 40A | 338 | 15.0 | 0.9 | 0.66 |
| ID-6 | 40B | 20A | 40A | 336 | 20.0 | 2.0 | 0.55 |
| ID-7 | 45B | 15A | 40A | 390 | 10.0 | 1.4 | 0.62 |
| ID-8 | 50B | 10A | 40A | 406 | 5.0 | 0.9 | 0.65 |
| ID-9 | 55B | 15A | 30A | 356 | 11.0 | 1.2 | 0.70 |
| ID-10 | 60B | 10A | 30A | 382 | 5.0 | 1.5 | 0.87 |
| ID-11 | 60B | 20A | 20A | 286 | 20.0 | 1.9 | 0.95 |

POM = polyoxymethylene
TPU = thermoplastic polyurethane

TABLE IE

Blends of Polyoxymethylene B/Thermoplastic Polyurethane B/Styrene Acrylonitrile B (SAN-B)

| Example No. | Wt % POM | Wt % TPU | Wt % SAN-B | Flexural Modulus (kpsi) | Elongation (%) | Izod (ft-lb/in) | Mold Shrinkage (%) |
|---|---|---|---|---|---|---|---|
| Control13 | — | — | 100B | 590 | 3.0 | 0.5 | 0.50 |
| Control14 | 100B | — | — | 440 | 48.0 | 2.4 | 1.56 |
| Control15 | 90B | 10A | — | 333 | 61.0 | 3.6 | 1.62 |
| IE-1 | 50B | — | 50B | 421 | 4.0 | 0.4 | 0.63 |

TABLE IE-continued

Blends of Polyoxymethylene B/Thermoplastic Polyurethane B/Styrene Acrylonitrile B (SAN-B)

| Example No. | Wt % POM | Wt % TPU | Wt % SAN-B | Flexural Modulus (kpsi) | Elongation (%) | Izod (ft-lb/in) | Mold Shrinkage (%) |
|---|---|---|---|---|---|---|---|
| IE-2 | 45B | 15A | 40B | 292 | 14.0 | 1.3 | 0.60 |

POM = polyoxymethylene
TPU = thermoplastic polyurethane

TABLE IF

Blends of Polyoxymethylene B/Thermoplastic Polyurethane A/Styrene Acrylonitrile C (SAN-C)

| Example No. | Wt % POM | Wt % TPU | Wt % SAN-C | Flexural Modulus (kpsi) | Elongation (%) | Izod (ft-lb/in) | Mold Shrinkage (%) |
|---|---|---|---|---|---|---|---|
| Control16 | — | — | 100C | 482 | 7.2 | 0.8 | 0.32 |
| Control17 | 100B | — | — | 440 | 48.0 | 2.4 | 1.56 |
| Control18 | 90B | 10A | — | 357 | 33.0 | 2.7 | 2.14 |
| IF-1 | 50B | — | 50C | 432 | 6.0 | 0.4 | 0.59 |
| IF-2 | 75B | — | 25C | 428 | 5.0 | 0.6 | 1.02 |
| IF-3 | 45B | 15A | 40C | 312 | 13.0 | 1.4 | 0.59 |
| IF-4 | 40B | 30A | 30C | 208 | 89.0 | 3.3 | 0.78 |
| IF-5 | 60B | 10A | 30C | 355 | 10.0 | 0.9 | 1.03 |

POM = polyoxymethylene
TPU = thermoplastic polyurethane

TABLE IG

Blends of Polyoxymethylene B/Thermoplastic Polyurethane A/Styrene Acrylonitrile C (SAN-C)

| Example No. | Wt % POM | Wt % TPU | Wt % SAN-C | Flexural Modulus (kpsi) | Elongation (%) | Izod (ft-lb/in) | Mold Shrinkage (%) |
|---|---|---|---|---|---|---|---|
| Control19 | — | — | 100C | 482 | 7.2 | 0.8 | 0.32 |
| Control20 | 100B | — | — | 440 | 48.0 | 2.4 | 1.56 |
| Control21 | 90B | 10A | — | 333 | 61.0 | 3.6 | 1.62 |
| IG-1 | 40B | 15A | 45C | 370 | 14.0 | 1.3 | 0.57 |
| IG-2 | 45B | 10A | 45C | 418 | 7.0 | 0.8 | 0.55 |
| IG-3 | 50B | 5A | 45C | 461 | 5.0 | 0.7 | 0.56 |
| IG-4 | 40B | 20A | 40C | 330 | 25.0 | 2.2 | 0.61 |
| IG-5 | 45B | 15A | 40C | 353 | 19.0 | 1.4 | 0.61 |
| IG-6 | 55B | 15A | 30C | 331 | 16.0 | 1.7 | 0.76 |

POM = polyoxymethylene
TPU = thermoplastic polyurethane

EXAMPLES IIA–IIB. BLENDS OF POLYOXYMETHYLENE/THERMOPLASTIC POLYURETHANE/ACRYLONITRILE-ALKENE-STYRENE RESIN

Examples IIA–IIB, the data for which is reported in Tables IIA–IIB, along with corresponding controls, relates to blends containing polyoxymethylene, thermoplastic polyurethane, and either an amorphous thermoplastic acrylonitrile-butadiene-styrene (ABS) resin or an amorphous thermoplastic acrylonitrile-ethylene (AES) resin.

TABLE IIA

Blends of Polyoxymethylene A/Thermoplastic Polyurethane A/Acrylonitrile-Ethylene-Styrene (AES)

| Example No. | Wt % POM | Wt % TPU | Wt % AES | Flexural Modulus (kpsi) | Elongation (%) | Izod (ft-lb/in) | Mold Shrinkage (%) |
|---|---|---|---|---|---|---|---|
| Control 22 | — | — | 100A | 323 | 17 | 9.2 | 0.45 |
| Control 23 | — | — | 100B | 326 | 13 | 10.5 | 0.44 |
| Control 24 | 100A | — | — | 380 | 32 | 2.3 | 2.20 |
| Control 25 | 70A | 30A | — | 183 | 80 | 23.0 | 1.24 |
| IIA-1 | 80A | — | 20A | 371 | 11 | 1.0 | 1.24 |
| IIA-2 | 50A | 5A | 45A | 333 | 11 | 1.1 | 0.79 |
| IIA-3 | 40A | 20A | 40A | 226 | 122 | 4.9 | 0.83 |
| IIA-4 | 50A | 10A | 40A | 289 | 19 | 2.0 | 0.91 |
| IIA-5 | 60A | 20A | 20A | 235 | 93 | 3.4 | 1.05 |
| IIA-6 | 50A | 10A | 40B | 288 | 19 | 2.5 | 0.95 |

POM = polyoxymethylene
TPU = thermoplastic polyurethane

TABLE IIB

Blends of Polyoxymethylene A/Thermoplastic Polyurethane A/Acrylonitrile-Butadiene-Styrene A (ABS-A)

| Example No. | Wt % POM | Wt % TPU | Wt % ABS-A | Flexural Modulus (kpsi) | Elongation (%) | Izod (ft-lb/in) | Mold Shrinkage (%) |
| --- | --- | --- | --- | --- | --- | --- | --- |
| Control 26 | — | — | 100A | 292 | 38 | 1.8 | 0.32 |
| Control 27 | 100A | — | — | 380 | 32 | 2.3 | 2.20 |
| Control 28 | 70A | 30A | — | 183 | 6.3 | 23.0 | 1.24 |
| IIB-1 | 80A | — | 20A | 386 | 12 | 0.9 | 1.18 |
| IIB-2* | 60A | — | 40A | 396 | 12 | 1.2 | 0.96 |
| IIB-3 | 50A | 5A | 45A | 338 | 29 | 1.6 | 0.68 |
| IIB-4 | 40A | 20A | 40A | 228 | 170 | 2.9 | 0.54 |
| IIB-5 | 50A | 10A | 40A | 296 | 54 | 2.7 | 0.69 |
| IIB-6 | 60A | 20A | 20A | 217 | 129 | 3.0 | 0.94 |
| IIB-7 | 98A | 1A | 1A | 382 | 42 | 1.5 | 1.73 |
| IIB-8 | 50A | 1A | 40A | 373 | 16 | 1.6 | 0.91 |
| IIB-9 | 20A | 40A | 40A | 90 | 216 | 12.3 | 0.69 |

POM = polyoxymethylene
TPU = thermoplastic polyurethane
*Boost on ram speed (mold pressure 9 kpsi) and then molding completed at 8 kpsi

EXAMPLE III. BLENDS OF POLYOXYMETHYLENE/THERMOPLASTIC POLYURETHANE/POLYCARBONATE

Example III, the data for which is reported in Table III. along with corresponding controls, relates to blends containing a polyoxymethylene, a thermoplastic polyurethane, and an amorphous thermoplastic polycarbonate.

EXAMPLE IV. BLENDS OF POLYOXYMETHYLENE/THERMOPLASTIC POLYURETHANE/AMORPHOUS THERMOPLASTIC POLYAMIDE

Example IV, the data for which is in Table IV, along with corresponding controls, relates to blends of polyoxymethylene, thermoplastic polyurethane, and amorphous thermoplastic polyamide. Mold shrinkage results show the inclusion of an amorphous thermoplastic polyamide into a polyoxymethylene/thermoplastic polyurethane composition results in a reduction in mold shrinkage experienced by the composition. Further, the blends of Examples IV-1 and IV-2 each have at least an acceptable balance of physical properties for use as a thermoplastic resin.

TABLE III

Blends of Polyoxymethylene A/Thermoplastic Polyurethane A/Polycarbonate (PC)

| Example No. | Wt % POM | Wt % TPU | Wt % PC | Flexural Modulus (kpsi) | Elongation (%) | Izod (ft-lb/in) | Mold Shrinkage (%) |
| --- | --- | --- | --- | --- | --- | --- | --- |
| Control 29 | — | — | 100A | 371 | 91 | 14.7 | 0.55 |
| Control 30 | — | — | 100B | 351 | 212 | N/A | 0.59 |
| Control 31 | 100A | — | — | 380 | 32 | 2.3 | 2.20 |
| Control 32 | 70A | 30A | — | 183 | 6.3 | 23.0 | 1.24 |
| III-1 | 80A | — | 20B | 402 | 9 | 1.0 | 1.46 |
| III-2[a] | 60A | — | 40B | 465 | 8 | 1.5 | 1.03 |
| III-3[b] | 50A | 5A | 45A | 364 | 6 | 0.8 | 0.99 |
| III-4[c] | 40A | 20A | 40A | 243 | 10 | 3.4 | 0.91 |
| III-5[d] | 60A | 10A | 30A | 328 | 14 | 1.7 | 1.13 |
| III-6[e] | 60A | 20A | 20A | 234 | 31 | 2.3 | 1.25 |
| III-7[f] | 40A | 20A | 40B | 237 | 93 | 10.4 | 0.82 |
| III-8[g] | 50A | 15A | 35B | 293 | 110 | 7.3 | 0.85 |
| III-9[h] | 60A | 20A | 20B | 251 | 50 | 3.8 | 1.17 |
| III-10 | 98A | 1A | 1B | 383 | 42 | 1.6 | 1.75 |
| III-11 | 20A | 40A | 40B | 129 | 127 | 10.4 | 0.54 |

POM = polyoxymethylene
TPU = thermoplastic polyurethane
N/A = not available
[a] boost on ram speed (mold pressure 17 kpsi) and then molding completed at 15 kpsi
[b] boost on ram speed (mold pressure 17 kpsi) and then molding completed at 15 kpsi
[c] boost on ram speed (mold pressure 20 kpsi) and then molding completed at 20 kpsi
[d] boost on ram speed (mold pressure 18 kpsi) and then molding completed at 18 kpsi
[e] mold pressure 16 kpsi
[f] mold pressure 16.5 kpsi
[g] boost on ram speed (mold pressure 13 kpsi) and then molding completed at 12 kpsi
[h] mold pressure 15.5 kpsi

TABLE IV

Blends of Polyoxymethlene A/Thermoplastic Polyurethane A/Polyamide (PAm)

| Example No. | Wt % POM | Wt % TPU | Wt % PAm | Flexural Modulus (kpsi) | Elongation (%) | Izod (ft-lb/in) | Mold Shrinkage (%) |
|---|---|---|---|---|---|---|---|
| Control 33 | — | — | 100 | 342 | 101 | 19.1 | 0.54 |
| Control 34 | 100A | — | — | 360 | 32 | 2.3 | 1.72 |
| Control 35 | 70A | 30A | — | 183 | 80 | 23.0 | 1.24 |
| IV-1 | 40A | 20A | 40 | 246 | 18 | 1.5 | 0.93 |
| IV-2* | 60A | 10A | 30 | 269 | 14 | 1.8 | 1.15 |

POM = polyoxymethylene
TPU = thermoplastic polyurethane
*mold pressure 15 kpsi

EXAMPLE V. BLENDS OF POLYOXYMETHYLENE/THERMOPLASTIC POLYURETHANE/AMORPHOUS THERMOPLASTIC POLYMER

Example V, the data for which is reported in Table V, along with the corresponding controls, relates to blends of polyoxymethylene, thermoplastic polyurethane, and various amorphous thermoplastic polymers. Mold shrinkage results show the inclusion of an amorphous thermoplastic polymer into the polyoxymethylene/thermoplastic polyurethane composition results in a reduction in mold shrinkage experienced by the composition.

EXAMPLE VI. BLENDS OF POLYOXYMETHYLENE COPOLYMER/THERMOPLASTIC POLYURETHANE/AMORPHOUS THERMOPLASTIC POLYMER

Example VI, the data for which is reported in Table VI, along with corresponding controls, relates to blends of polyoxymethylene copolymer, thermoplastic polyurethane, and amorphous thermoplastic polymer. Mold shrinkage results show that the blends of polyoxymethylene/thermoplastic polyurethane/amorphous thermoplastic polymer experience less than 1% mold shrinkage. Further, the ternary blends have at least an acceptable balance of physical properties for use as a thermoplastic resin.

TABLE V

Blends of Polyoxymethylene/Thermoplastic Polyurethane/Amorphous Thermoplastic Polymer

| Example No. | Wt % POM | Wt % TPU | Wt % Amorphous Polymer | Flexural Modulus (kpsi) | Elongation (%) | Izod (ft-lb/in) | Mold Shrinkage (%) |
|---|---|---|---|---|---|---|---|
| Control 36 | 100A | — | — | 360 | 32 | 2.3 | 1.72 |
| Control 37 | 70A | 30A | — | 183 | 80 | 23.0 | 1.24 |
| Control 38 | — | — | 100 HIPS | 312 | 32 | 4.8 | 0.51 |
| V-1[a] | 80A | — | 20 HIPS | 397 | 33 | 1.5 | 1.36 |
| V-2[b] | 60A | — | 40 HIPS | 371 | 17 | 1.2 | 1.00 |
| V-3 | 60A | 20A | 20 HIPS | 252 | 47 | 2.5 | 0.99 |
| V-4 | 40A | 20A | 40 HIPS | 229 | 37 | 2.1 | 0.68 |
| Control 39 | — | — | 100 PAr | 294 | 36 | 5.8 | 0.97 |
| V-5[c] | 60A | 20A | 20 PAr | 212 | 8 | 1.6 | 1.46 |
| Control 40 | — | — | 100 PC/SA | 344 | 45 | N/A | 0.59 |
| V-6 | 50A | 10A | 40 PC/SA | 302 | 16 | 1.5 | 0.78 |
| Control 41 | — | — | 100 MMA | 333 | 27 | N/A | 0.25 |
| V-7[d] | 60A | 20A | 20 MMA | 258 | 38 | 1.4 | 1.16 |
| Control 42 | — | — | 100 IA | 550 | 3 | N/A | 0.43 |
| V-8[e] | 60A | 20A | 20 IA | 252 | 34 | 2.0 | 1.32 |
| Control 43 | — | — | 100 MP | 371 | 40 | 3.8 | 0.66 |
| V-9[f] | 60A | 20A | 20 MP | 289 | 5 | 1.3 | 1.21 |
| Control 44 | — | — | 100 SMA | 330 | 12 | 2.1 | 0.63 |
| V-10[g] | 60A | 20A | 20 SMA | 231 | 51 | 3.0 | 1.23 |

N/A = not available
POM = polyoxymethylene
TPU = thermoplastic polyurethane
[a] boost on ram speed (mold pressure 8 kpsi) and then molding completed at 7 kpsi
[b] boost on ram speed (mold pressure 7 kpsi) and then molding completed at 6 kpsi
[c] boost on ram speed (mold pressure 17 kpsi) and then molding completed at 16 kpsi
[d] boost on ram speed (mold pressure 12 kpsi) and then molding completed at 10 kpsi
[e] boost on ram speed (mold pressure 13 kpsi) and then molding completed at 12 kpsi
[f] mold pressure 16 kpsi
[g] mold pressure 15 kpsi

TABLE VI

Blends of Polyoxymethylene Copolymer D/Thermoplastic Polyurethane A/Amorphous Thermoplastic Polymer

| Example No. | Wt % POM | Wt % TPU | Wt % Amorphous Polymer | Flexural Modulus (kpsi) | Elongation (%) | Izod (ft-lb/in) | Mold Shrinkage (%) |
|---|---|---|---|---|---|---|---|
| Control 45 | 100D | — | — | 320 | 35 | 1.6 | 1.67 |
| Control 46 | — | — | 100 SAN-A | 561 | 4.8 | 0.4 | 0.28 |

TABLE VI-continued

Blends of Polyoxymethylene Copolymer D/ Thermoplastic Polyurethane A/Amorphous Thermoplastic Polymer

| Example No. | Wt % POM | Wt % TPU | Wt % Amorphous Polymer | Flexural Modulus (kpsi) | Elongation (%) | Izod (ft-lb/in) | Mold Shrinkage (%) |
|---|---|---|---|---|---|---|---|
| Control 47 | — | — | 100 ABS-A | 292 | 38 | 1.8 | 0.32 |
| VI-1 | 50D | 15A | 35 SAN-A | 338 | 31 | 1.7 | 0.70 |
| VI-2 | 50D | 15A | 35 ABS-A | 243 | 186 | 2.3 | 0.63 |
| Control 48 | — | — | 100 PSu | 395 | 232 | N/A | 0.60 |
| VI-3 | 60D | 20A | 20 PSu | 180 | 11 | 1.2 | 1.10 |
| VI-4[a] | 60D | 20A | 20 PPE | 177 | 12 | 0.8 | 1.10 |
| Control 49 | — | — | 100 PAr | 294 | 36 | 5.8 | 0.97 |
| VI-5[b] | 60D | 20A | 20 PAr | 187 | 10 | 1.4 | 1.15 |

POM = polyoxymethylene copolymer
TPU = thermoplastic polyurethane
[a] mold pressure 18 kpsi
[b] barrel temperatures set as follows: rear - 210° C.; center, front, and nozzle - 220° C.

EXAMPLE VII. BLENDS OF VARIOUS POLYOXYMETHYLENE HOMOPOLYMERS WITH THERMOPLASTIC POLYURETHANE/AMORPHOUS THERMOPLASTIC POLYMER

In Control Examples 50–51 and Examples VII-1 through VII-8, the polyoxymethylene used was an acetate end-capped homopolymer having a number average molecular weight of about 35,000. Additionally, the polyoxymethylene homopolymer contained the thermal stabilizer(s) and antioxidant(s) detailed in Table VIIA, below. The weight percents in Table VIIA are based upon the total weight of the polyoxymethylene, the thermal stabilizer(s), and the antioxidant(s).

The thermal stabilizers of Table VIIA are as follows:

Stablizer "A" was a non-meltable polymer stabilizer, containing formaldehyde reactive nitrogen groups, as described in U.S. Pat. No. 5,011,890. It was prepared by adding a solution of 14.3 kg of acrylamide and 145.15 grams of 1,4-butanediol diacrylate to a refluxing solution of 1.44 kg of polyethylene glycol having a molecular weight of about 8000 in 48.06 kg of methanol (approximately 64° C.) over a period of about two hours. Throughout this addition, a total of 195.04 grams of tert-butylperoxypivylate polymerization initiator was portionwise added. The resulting reaction suspension was cooled and filtered. The resulting white solid was washed with methanol and dried in a vacuum oven (6.75×10⁴ Pa) at 70° C. for 1 day and at 100° C. for 1 day.

Stabilizer "B" was a 43/34/23 polycaprolactum/-polyhexamethylene adipamide/polyhexamethylene sebacamide terpolymer. It had a melting point, measured in accordance with ASTM D796, between 148°–160° C.

Stabilizer "C" was a 29/79 copolymer of ethylene and vinyl alcohol prepared in accordance with U.S. Pat. No. 4,766,168. It had a melting point, measured in accordance with ASTM D796, of about 191° C.

The antioxidants of Table VIIA are as follows:

Antioxidant "A" was 2,2-methylene-bis-(4-methyl-6-tert-butyl-phenol);

Antioxidant "B" was N,N'-hexamethylene-bis-3-(3,5-di-tert-butyl-4-hydroxy phenol) proprionate; and Antioxidant "C" was tuethylene glycol-bis-3-(tert-butyl-4-hydroxy-5-methyl phenyl) proprionate.

The components of the blends of Control Examples 50–51 and VII-1 through VII-8 are given in Table VIIB below.

The blends of Control Examples 50–51 along with those of Examples VII-1, VII-2, and VII-5 through VII-8, were prepared as follows:

The components of the blends were melt compounded on a 28 mm Werner & Pfleiderer bilobal extruder, using a screw design containing two working sections with five kneading elements (70 mm total), and two reverse elements (24 mm total). All components were supplied from the main feeder at the rear of the extruder. The extruder was operated at about 150 rpm with 15–25 pounds per hour throughout. The temperature of the melt coming out of the die ranged from 210° C. to 230° C.

The blends of Examples VII-3 and VII-4 were prepared as follows:

The components of the bend were melt compounded in two steps. In the first step, the polyoxymethylene component, the thermal stabilizer component(s), and the antioxidant(s) were compounded on a 2½" sterling screw extruder with a screw speed of 60 rpm. The temperature of the melt exiting the extruder was between 225°–240° C. The resultant polyoxymethylene product was pelletized. In the second step, the pelletized product was melt compounded with the thermoplastic polyurethane component and the amorphous thermoplastic polymer component of the blend under the same conditions as described above for Examples VII-5 through VII-8.

Test results on the blends of Control Examples 50–51 and VII-1 through VII-8 are given below in Table VIIB.

TABLE VIIA

POLYOXYMETHYLENE HOMOPOLYMERS USED IN TABLE VIIB

| Polyoxymethylene | Wt % Thermal Stabilizer | Wt % Antioxidant |
|---|---|---|
| E | 0.45A | 0.18B |
| F | 0.27B/0.45A | 0.18B |
| G | 0.45A | 0.10B |
| H | 0.27B/0.45A | 0.10B |
| I | 0.25A | 0.11C |
| J | 0.25A/0.13C | 0.06C/0.05B |
| K | 0.45A/0.40B | 0.10B |
| L | 0.45A | 0.11C |

TABLE VIIB

Polyoxymethylene/Thermoplastic Polyurethane/ Amorphous Thermoplastic Polymer Blends

| Example No. | Wt % POM | Wt % TPU | Wt % Amorphous Polymer | Elongation (%) | Izod (ft-lb/in) | Mold Shrinkage (%) |
|---|---|---|---|---|---|---|
| Control 50 | 90E | 10A | — | 39.0 | 1.66 | 2.58 |
| Control 51 | 90F | 10A | — | 38.0 | 1.52 | 2.60 |
| VII-1 | 50G | 10A | 40 PC-C | 15.0 | 1.78 | 1.16 |
| VII-2 | 50H | 10A | 40 PC-C | 13.0 | 1.80 | 1.29 |
| VII-3 | 50I | 10A | 50 ABS-A | 30.4 | 1.65 | 0.89 |
| VII-4 | 50J | 10A | 40 ABS-A | 30.0 | 1.74 | 0.98 |
| VII-5 | 50G | 10A | 40 AES-C | 23.0 | 1.17 | 1.27 |
| VII-6 | 50K | 10A | 40 AES-C | 29.0 | 1.07 | 1.35 |
| VII-7 | 40L | 10A | 50 SAN-A | 14.8 | 1.00 | 0.88 |
| VII-8 | 40J | 10A | 50 SAN-A | 9.0 | 0.79 | 0.91 |

I claim:

1. A polyoxymethylene blend comprising essentially of
   (a) 45-90 weight percent of an oxymethylene polymer,
   (b) 5-30 weight percent of a thermoplastic polyurethane, and
   (c) 5-50 weight percent of at least one amorphous thermoplastic polymer selected from the group consisting of
      (c1) styrenics selected from sytrene acrylonitrile copolymer, styrene acrylonitrile copolymer toughened with a rubber, high impact styrene, styrene maleic anhydride copolymer, styrene acrylonitrile maleic anhydride polymer or styrene acrylic polymer;
      (c2) polyamides;
      (c3) polyarylates;
      (c4) polyphenylene ethers;
      (c5) polysulfones; and
      (c6) acrylics selected from imidized acrylics or polymethyl methacrylate,
   wherein the above given weight percents are based upon the total weight of components (a), (b), and (c) only.

2. A polyoxymethylene blend consisting essentially of
   (a) 40 to 70 weight percent of an oxymethylene polymer,
   (b) 10 to 20 weight percent of a thermoplastic polyurethane, and
   (c) 20 to 40 weight percent of a polycarbonate,
   wherein said weight percents are based upon the total weight of components (a), (b), and (c) only.

3. The blend of claim 1 wherein the amorphous thermoplastic polymer is a styrene acrylonitrile copolymer.

4. The blend of claim 1 wherein the component (c1) styrene acrylonitrile copolymer toughened with a rubber is acrylonitrile-butadiene-styrene resin.

5. The blend of claim 1 wherein the component (c1) styrene acrylonitrile copolymer toughened with a rubber is acrylonitrile-ethylene-propylene-styrene resin.

6. The blend of claim 1 wherein the amorphous thermoplastic polymer is a polyamide.

7. The blend of claim 1 wherein the amorphous thermoplastic polymer is a polyarylate.

8. The blend of claim 1 wherein the amorphous thermoplastic polymer is a polyphenylene ether.

9. The blend of claim 1 wherein the amorphous thermoplastic polymer is a high impact styrene resin.

10. The blend of claim 1 wherein the amorphous thermoplastic polymer is an imidized acrylic resin.

11. The blend of claim 1 wherein the amorphous thermoplastic polymer is a styrene maleic anhydride copolymer.

12. The blend of claim 1 wherein the amorphous thermoplastic polymer is a polysulfone.

13. The blend of claim 1 wherein the amorphous thermoplastic polymer component is a blend of two or more amorphous thermoplastic polymers.

14. The blend of claim 1 wherein the polyoxymethylene polymer is a homopolymer.

15. The blend of claim 1 wherein the polyoxymethylene polymer is a copolymer.

16. The blend of claim 1 further comprising at least one of stabilizers, co-stabilizers, antioxidants, pigments, colorants, UV stabilizers, toughening agents, nucleating agents, and fillers.

17. Shaped articles made from the composition of claim 1.

18. A shaped article of claim 17 selected from the group consisting of sheet, profiles, rod stock, film, filaments, fibers, strapping, tape, tubing, and pipe.

* * * * *